United States Patent [19]

Ishida et al.

[11] Patent Number: 5,268,162

[45] Date of Patent: Dec. 7, 1993

[54] METHOD FOR PRODUCING A PARTICULATE ZEOLITE AND A PARTICULATE ZEOLITE PRODUCED THEREBY

[75] Inventors: Hiroshi Ishida; Koji Nakagawa, both of Kurashiki, Japan

[73] Assignee: Asahi Kasei Kogyo Kabushiki Kaisha, Osaka, Japan

[21] Appl. No.: 882,015

[22] Filed: May 13, 1992

[30] Foreign Application Priority Data

May 17, 1991 [JP] Japan .................................. 3-140775

[51] Int. Cl.$^5$ ............................................. C01B 33/34
[52] U.S. Cl. ............................. 423/704; 423/DIG. 22
[58] Field of Search ............... 423/326, 328, 329, 330, 423/704, DIG. 22

[56] References Cited

U.S. PATENT DOCUMENTS

| | | | |
|---|---|---|---|
| 3,702,886 | 11/1972 | Argauer et al. | 423/328 |
| 3,926,782 | 12/1975 | Plank et al. | 208/135 |
| 4,175,114 | 11/1979 | Plank et al. | 423/700 |
| 4,366,135 | 12/1982 | Le Van Mao et al. | 423/329 |
| 4,526,879 | 7/1985 | Dwyer et al. | 423/329 |
| 4,537,757 | 8/1985 | Chono et al. | 423/328 |
| 4,581,216 | 4/1986 | Iwayama et al. | 423/329 |
| 4,627,968 | 12/1986 | Kai | 423/329 |
| 4,818,509 | 4/1989 | Dwyer et al. | 423/329 |
| 4,954,326 | 9/1990 | Onodera et al. | 423/328 |

FOREIGN PATENT DOCUMENTS

| | | | |
|---|---|---|---|
| 0026963 | 4/1981 | European Pat. Off. | |
| 110650 | 6/1984 | European Pat. Off. | 423/329 |
| 306238 | 3/1989 | European Pat. Off. | 423/328 |
| 2049755 | 4/1971 | Fed. Rep. of Germany . | |
| 2548697 | 5/1976 | Fed. Rep. of Germany . | |
| 2643929 | 4/1977 | Fed. Rep. of Germany . | |
| 2924870 | 1/1980 | Fed. Rep. of Germany . | |
| 58-45111 | 3/1983 | Japan . | |
| 60-71519 | 4/1985 | Japan . | |
| 60-77123 | 5/1985 | Japan . | |
| 60-251121 | 12/1985 | Japan | 423/328 |
| 61-58812 | 3/1986 | Japan . | |
| 61-59246 | 12/1986 | Japan . | |
| 63-315512 | 12/1988 | Japan . | |
| 1-180835 | 7/1989 | Japan . | |
| 3-39009 | 6/1991 | Japan . | |
| 1553209 | 9/1979 | United Kingdom . | |
| 2164326 | 3/1986 | United Kingdom . | |

OTHER PUBLICATIONS

Patent Abstracts of Japan, vol. 9, No. 211, Aug. 29, 1985.
Patent Abstracts of Japan, vol. 9, No. 205, Aug. 22, 1985.
Patent Abstracts of Japan, vol. 11, No. 192, Jun. 19, 1987.
Patent Abstracts of Japan, vol. 13, No. 158, Apr. 17, 1989.

*Primary Examiner*—R. Bruce Breneman
*Attorney, Agent, or Firm*—Birch, Stewart, Kolasch & Birch

[57] ABSTRACT

Finely particulate Zeolites of the ZSM-5 family, exhibiting characteristic peaks in an X-ray powder diffraction pattern, are stably produced by a novel method in which a nucleating slurry containing semi-crystalline zeolite having a BET surface area of 100 to less than 250 m$^2$/g is mixed with a raw material mixture of silica, alumina and alkali metal sources to obtain a preliminary slurry, followed by heating to obtain a first precursory slurry mixture containing a precursory zeolite having a BET surface area of 100 to 200 m$^2$/g, and subsequently the first precursory slurry mixture is mixed with a raw material mixture as mentioned above to obtain a second precursory slurry, followed by heating to obtain a product slurry containing a finely particulate zeolite having a BET surface area of at least 250 m$^2$/g. In the method, the first precursory slurry mixture can be advantageously recycled and used as a nucleating slurry. The zeolites are advantageously utilized as catalysts, for example, as a catalyst for hydration of olefins, and also as an adsorbent, a molecular sieve, an agent for soil improvement, a filler for paper and an agent for waste water treatment.

13 Claims, 27 Drawing Sheets

5μm

5μm

5μm 0.6 μm 0.6 μm

2μm

2θ

0.6μm

2θ

10 μm

10μm

2μm

METHOD FOR PRODUCING A PARTICULATE ZEOLITE AND A PARTICULATE ZEOLITE PRODUCED THEREBY

BACKGROUND OF THE INVENTION

1. Field of the Invention

The present invention relates to a method for producing a particulate zeolite and a particulate zeolite produced by the method. More particularly, the present invention is concerned with a method for producing a particulate zeolite in a slurry form or in an isolated form, in which a nucleating slurry is mixed with a first raw material mixture and heated to obtain a precursory slurry mixture and subsequently the precursory slurry mixture is mixed with a second raw material mixture and heated to obtain a product slurry. Also, the present invention is concerned with fine particles of a zeolite in a slurry form or in an isolated form, produced by the above-mentioned method. The produced zeolite exhibits in a dry solid form peaks ascribed to interplanar spacings of $11.1\pm0.2$, $10.1\pm0.2$, $3.85\pm0.07$, $3.74\pm0.05$ and $3.72\pm0.05$ angstroms in an X-ray powder diffraction pattern, which are characteristic of zeolites of the ZSM-5 family.

The particulate zeolite is widely utilized as for example, an adsorbent, a catalyst, a molecular sieve, an agent for soil improvement, a filler for paper and an agent for waste water treatment.

2. Discussion of Related Art

ZSM-5 is a synthetic zeolite developed by Mobil Oil Corporation, N.Y., the United States (see U.S. Pat. No. 3,702,886). Initially, ZSM-5 was synthesized by performing crystallization from a raw material mixture comprised of silica, alumina, an alkali metal, a tetrapropylammonium salt and water. Thereafter, proposals were made to use a cheaper substitute material for the tetrapropylammonium salt which is very expensive. As a substitute material, an alcohol was proposed in Japanese Patent Application Laid-Open Specification No. 52-43800/1977, a lower alkyl urea was proposed in Japanese Patent Application Laid-Open Specification No. 61-68319/1986, and an aminoalcohol was proposed in Japanese Patent Application Laid-Open Specification No. 57-7818/1982.

Further, various proposals were made for producing ZSM-5 zeolites by the use of ZSM-5 seeds. In U.S. Pat. No. 4,175,114, ZSM-5 seeds were employed to decrease the amount of expensive tetrapropylammonium salt. In Japanese Patent Application Publication Specification No. 61-59246/1986, ZSM-5 seeds were employed in place of the expensive tetrapropylammonium salt. In Japanese Patent Application Laid-Open Specification Nos. 60-71519/1985 and 60-77123/1985, ZSM-5 seeds were partly recycled. These proposals have a drawback in that it is difficult to produce fine particles of ZSM-5 zeolites.

Still further, various proposals were made for producing fine particles of ZSM-5 zeolites. In Japanese Patent Application Laid-Open Specification No. 56-54222/1981, strong agitation was carried out during crystallization, without the use of seeds, to obtain fine particles of ZSM-5 zeolites. In Japanese Patent Application Laid-Open Specification No. 50-5335/1975, aging was performed by allowing a pre-crystallization mixture of ZSM-5 to stand still at a temperature of from 90° to 110° C. for a period of several days to thereby obtain fine particles of ZSM-5 zeolites. These proposals have a drawback in that operations are not easy, causing reproducibility to be poor.

Moreover, in Japanese Patent Application Laid-Open Specification No. 61-58812/1986, it was proposed to employ a method in which first a raw material mixture containing no organic cation is crystallized to obtain a crystalline aluminosilicate powder exhibiting a specific X-ray diffraction pattern, and subsequently particulate ZSM-5 is synthesized in the presence of an organic cation using the powder as ZSM-5 seeds. This proposal has a drawback in that separation of alumino-silicate powder is required, which is not easy.

The present inventors previously proposed a method for producing particulate ZSM-5 as disclosed in Japanese Patent Application Laid-Open Specification No. 63-315512/1988, in which first a precursory slurry mixture containing ZSM-5 having a low crystallinity is produced in the presence of an organic material of a lower alkyl urea, and subsequently the precursory slurry mixture is mixed with a raw material mixture, followed by heating to effect a hydrothermal reaction of the mixture of the raw material mixture and the precursory slurry mixture. Further, the present inventors previously proposed another method for producing particulate ZSM-5 as disclosed in Japanese Patent Application Laid-Open Specification No. 1-180835/1989, in which first a precursory slurry mixture containing semicrystalline ZSM-5 is produced in the absence of an organic material, and subsequently the precursory slurry mixture is mixed with a raw material mixture, followed by heating to effect a hydrothermal reaction of the mixture of the raw material mixture and the precursory slurry mixture. These proposals have a drawback in that control of crystallization of the formed zeolite is difficult, so that desired particulate ZSM-5 cannot be produced with high reproducibility.

The zeolites of the ZSM-5 family exhibiting peaks ascribed to interplanar spacings of $11.1\pm0.2$, $10.1\pm0.2$, $3.85\pm0.07$, $3.74\pm0.05$ and $3.72\pm0.05$ angstroms in an X-ray powder diffraction pattern are not limited to the above zeolites, and include other various zeolites, such as ZSM-8 zeolite disclosed in German Patent No. 2,049,755, ZETA-1 zeolite disclosed in German Patent No. 2,548,697, ZETA-3 zeolite disclosed in U.K. Patent No. 1,553,209, NU-4 zeolite disclosed in German Patent No. 3,268,503, NU-5 zeolite disclosed in German Patent No. 3,169,606, TZ-01 zeolite disclosed in U.S. Pat. No. 4,581,216, crystalline aluminosilicate disclosed in U.S. Pat. No. 4,954,326, TRS zeolite disclosed in German Patent No. 2,924,870, MB-28 zeolite disclosed in European Patent No. 21,445, TSZ zeolite disclosed in Japanese Patent Application Laid-Open Specification No. 58-45111/1983 and AZ-1 zeolite disclosed in European Patent No. 113,116.

As described above, various proposals have been made for producing zeolites of the family of ZSM-5. However, there is still a strong demand for a method by which a zeolite of the ZSM-5 family zeolite in a finely particulate form is efficiently produced with high reproducibility.

SUMMARY OF THE INVENTION

With a view toward developing a method for efficiently producing a zeolite of the family of ZSM-5 in a finely particulate form with high reproducibility, the present inventors have made extensive and intensive studies. As a result, they have found that a precursory slurry mixture containing a precursory zeolite having a surface area of from 100 to 200 m²/g can be stably produced with high reproducibility by heating a raw material mixture, comprised of a silica source, an alumina source, an alkali metal source and water, together with a nucleating slurry. Also, they have found that when a hydrothermal reaction of such a raw material mixture is conducted in the presence of the thus produced precursory slurry mixture, a desired zeolite of the family of ZSM-5 in a finely particulate form can be stably produced with high producibility. The present invention has been made, based on these novel findings.

Accordingly, it is an object of the present invention to provide a novel method for efficiently, stably producing a finely particulate zeolite of the family of ZSM-5 in a slurry form or in an isolated form with high reproducibility.

It is another object of the present invention to provide a zeolite of the family of ZSM-5 which is in a finely particulate form to thereby have high catalytic activity and improved adsorptivity.

The foregoing and other objects, features and advantages of the present invention will be apparent from the following detailed description and appended claims taken in connection with the accompanying drawings.

DETAILED DESCRIPTION OF THE INVENTION

Essentially, according to the present invention, there is provided a method for producing a particulate zeolite in a slurry form or in an isolated form, which comprises the steps of:

(1) providing a nucleating slurry comprising a semicrystalline zeolite dispersed in an aqueous medium, the semicrystalline zeolite exhibiting in a dry solid form peaks ascribed to interplanar spacings of $11.1\pm0.2$, $10.1\pm0.2$, $3.85\pm0.07$, $3.74\pm0.05$ and $3.72\pm0.05$ angstroms in an X-ray powder diffraction pattern and having a surface area of from 100 to less than 250 m$^2$/g as measured by the BET nitrogen adsorption method, (2) mixing the nucleating slurry with a first raw material mixture comprised of a silica source, an alumina source, an alkali metal source and water to obtain a preliminary slurry mixture, (3) heating the preliminary slurry mixture under agitation to form a first precursory slurry mixture comprising a precursory zeolite dispersed in an aqueous medium, the precursory zeolite exhibiting in a dry solid form peaks of the same characteristics as defined above in the X-ray powder diffraction pattern and having a surface area of from 100 to 200 m$^2$/g as measured by the BET nitrogen adsorption method, (4) mixing at least a portion of the first precursory slurry mixture with a second raw material mixture comprised of a silica source, an alumina source, an alkali metal source and water to obtain a second precursory slurry mixture, (5) heating the second precursory slurry mixture until a product slurry comprising a particulate zeolite dispersed in an aqueous medium is obtained, the particulate zeolite exhibiting in a dry solid form peaks of the same characteristics as defined above in the X-ray powder diffraction pattern and having a surface area of at least 250 m$^2$/g as measured by the BET nitrogen adsorption method, and optionally (6) isolating the particulate zeolite from the product slurry.

As mentioned above, the zeolites which can be produced by the method of the present invention, are of the ZSM-5 family and exhibit peaks ascribed to interplanar spacings of $11.1\pm0.2$, $10.1\pm0.2$, $3.85\pm0.07$, $3.74\pm0.05$ and $3.72\pm0.05$ angstroms in an X-ray powder diffraction pattern, and include for example, ZSM-5 zeolites, ZSM-8 zeolites, ZETA-1 zeolites, ZETA-3 zeolites, NU-4 zeolites, NU-5 zeolites, TZ-01 zeolites, crystalline aluminosilicates, TRS zeolites, MB-28 zeolites, TSZ zeolites and AZ-1 zeolites.

The zeolite produced by the method of the present invention is fine particles irrespective of whether the zeolite is in a slurry form or in an isolated form, so that it has, for example, a high catalytic activity and a prolonged catalyst life.

Figure 20:
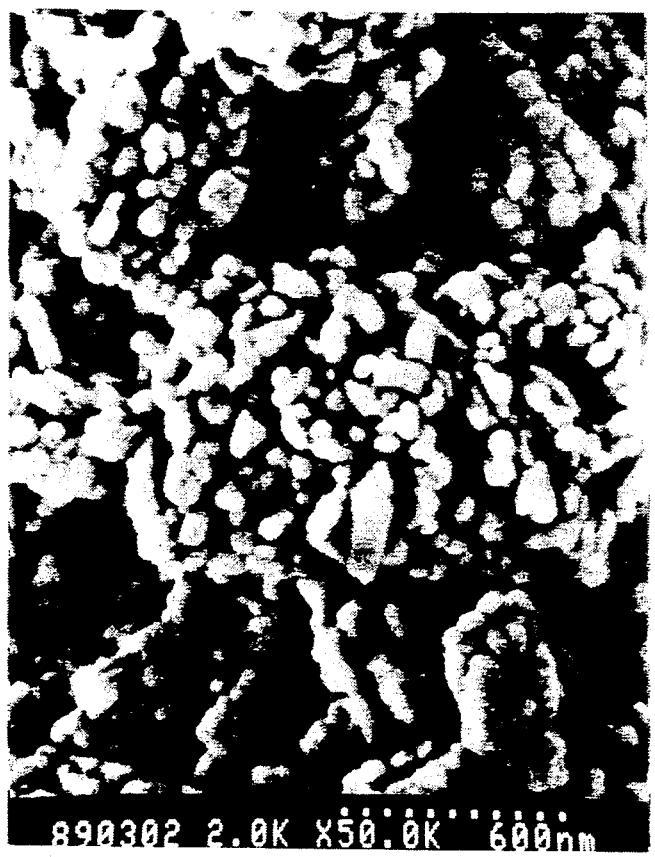
FIG. 20 shows a scanning electron photomicrograph of a particulate zeolite obtained by successively subjecting the product slurry produced in Example 5 to conversion to an H (proton) form, filtration, water washing and drying.
Figure 24:
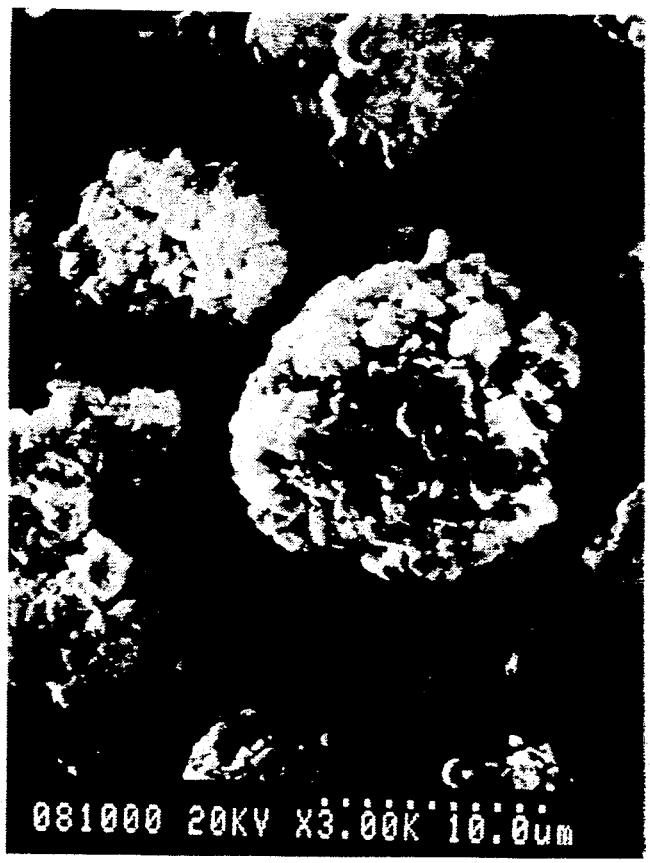
FIG. 24 shows a scanning electron photomicrograph of a particulate zeolite obtained by successively subjecting the product slurry produced in Comparative Example 4(1) to filtration, water washing and drying.

In the present invention, at least 50% by weight the zeolite has a particle size of 1.0 μm or less, preferably 0.5 μm or less, and most preferably 0.1 μm or less, in terms of the size of primary particles as observed by a scanning electron microscope. The primary particles contained in the particulate zeolite have various morphologies. For example, the primary particles may each be ellipsoidal as shown in FIG. 20, globular as shown in FIG. 24, or platy. In the case of ellipsoidal primary particle, the particle size is defined as the length of the minor axis of the primary particle, which is about 0.05 μm in FIG. 20. In the case of globular primary particle, the particle size is defined as the diameter of the primary particle, which is about 12 μm in FIG. 24. In the case of platy primary particle, the particle size is defined as the thickness of the platy primary particle.

In the particulate zeolite of the present invention, primary particles may be individually present or cohere with each other to form aggregates as secondary particles. In some cases, it cannot be judged on a scanning electron photomicrograph whether the paraticulate zeolite is a single big primary particle having rough surface or it is an aggregate formed by the coherence of primary particles. In these cases, the particle size cannot be measured by the observation with an electron microscope.

In view of such a limited applicability of the electron microscopic observation to the measurement of the zeolite particle size, it is advantageous to evaluate the zeolite particle size in terms of the ratio of the number of external surface acid sites to the total number of acid sites. The particulate zeolite of the present invention generally has a particle size of at least 0.03, preferably at least 0.05, and most preferably at least 0.1 in terms of the ratio of the number of external surface acid sites to the total number of acid sites, as measured by the following method.

The particulate zeolite produced by the method of the present invention contains an alkali metal cation, and accordingly called a zeolite in an alkali metal form. Since a representative alkali metal cation is a sodium cation, a representative zeolite is in a Na form. Before measuring the acid sites, the alkali metal cation must be replaced by a proton to thereby obtain a zeolite in a proton form, also known as an H form.

The conversion of a particulate zeolite in a slurry form from an alkali metal form to an H form can be carried out by various methods, depending on whether an organic material is present in the slurry, and depending on the type of the organic material.

Illustratively stated, the conversion of a zeolite from an alkali metal form to an H form is carried out according to the following procedure. First, a product slurry obtained by the method of the present invention is filtered to obtain a cake, and the cake is washed with a 5-fold volume of water. When an organic material is present in the product slurry, the cake is dried at 120° C. for 8 hours, and calcined at 500° C. for 6 hours under circulating air to thereby remove the organic material. After calcination, the resultant zeolite is put in 1N nitric acid to obtain a 10% by weight slurry, and heated at 60° C. for 4 hours to effect ion exchange. The resultant slurry is filtered to obtain a cake, and the cake is washed with a 5-fold volume of water, followed by drying at 120° C. for 10 hours. Thus, a zeolite in an H form is obtained.

On the other hand, when no organic material is present in the product slurry, the above-mentioned cake obtained by filtration and water washing is directly put in 1N nitric acid, followed by the same procedure as described above, to thereby obtain a zeolite in an H form.

The thus obtained zeolite in an H form is subjected to measurement of acid sites as described in *Shokubai* (catalyst), vol. 25, p 461 (1983).

In the measurement of acid sites, use is made of, for example, an apparatus comprised of Gas Chromatograph GC-7A and, connected thereto, Data Processor CR-1A, which are products of Shimadzu Corporation, Japan. A sample zeolite (0.2-1.0 g) is charged into a column of stainless steel (SUS) having an inner diameter of 4 mm and a length of 80 mm. The column is housed in a sample-side passage of a thermostatic chamber of Gas Chromatograph GC-7A. The temperature of the thermostatic chamber is set at 325° C., and helium gas, as a carrier gas, is allowed to flow through the column at a rate of 50 ml/min.

A predetermined amount (0.2 to 2 μl) of an amine (selected from pyridine and 4-methylquinoline) is intermittently injected into an inlet of the sample-side passage at an interval of 2 to 5 minutes by means of a microsyringe.

The carrier gas having passed through the column charged with the zeolite is analyzed by an FID detector, and as a result, a chromatogram is obtained. The chromatogram shows periodically appearing peaks, by which the change with time of the amine concentration of the carrier gas is determined. As the number of intermittent amine injections is increased, the total amount of amine adsorbed onto the sample zeolite is increased. However, when the amine adsorption becomes close to a saturation, the amount of adsorbed amine is decreased while the amount of unadsorbed amine is increased. Accordingly, in the above-mentioned chromatogram, peak area $S_i$ corresponding to the i-th injection (when injections are conducted i times) of the amine approaches to area $S_o$ corresponding to the amount of injected amine with the increase of the i of the $S_i$.

The amount of adsorbed amine, $A_o$ (μmol/g), per weight of the sample zeolite is calculated according to the following formula:

$$A = 1/W \sum_{i=1}^{\infty} (1 - S_i/S_o)d_o, \quad (I)$$

wherein W represents the weight (g) of the sample zeolite, and $d_o$ represents the amount (μmol) of amine injected at each injection.

In the present invention, the amine injections are repeated until the n-th injection (when injections are conducted n times) at which the inequality $S_i/S_o > 0.98$ is satisfied, and the amount of adsorbed amine, A (μmol/g), is calculated according to the following formula:

$$A = 1/W \sum_{i=1}^{n} (1 - S_i/S_o)d_o, \quad (II)$$

wherein W and $d_o$ are as defined above.

In the present invention, the total number of acid sites is represented by the amount of adsorbed amine determined according to the above procedure, wherein the amine is pyridine. On the other hand, the number of external surface acid sites is represented by the amount of adsorbed amine determined according to the above procedure, wherein the amine is 4-methylquinoline.

The nucleating slurry provided in step (1) of the method of the present invention is added in order to control the crystallization rate during the formation of the first precursory slurry mixture in step (3) of the method of the present invention. On the other hand, the first precursory slurry mixture for use in the present invention is added in order to promote the crystallization of the precursory zeolite so as to produce fine particles during the production of the product slurry in step (5) of the method of the present invention. The nucleating slurry provided in step (1) may be a portion of the first precursory slurry mixture obtained in step (3).

The terminology "slurry" used herein means an aqueous dispersion of a zeolite having a zeolite concentration of from 1 to 50% by weight, the concentration being determined by a procedure in which first the slurry is filtered to obtain a cake, subsequently the cake is dried at 120° C. for 8 hours to obtain a dry zeolite and thereafter the dry zeolite is weighed, followed by calculation of the concentration from the weight.

The nucleating slurry to be provided in step (1) of the method of the present invention comprises a semicrystalline zeolite dispersed in an aqueous medium. The terminology "semicrystalline" used herein means a state which is not completely amorphous and also not completely crystalline. Recognition of this state can be made from an X-ray powder diffraction pattern of the zeolite obtained by filtering the nucleating slurry and drying the resultant cake. When the zeolite is in a completely amorphous form, an X-ray powder diffraction pattern thereof shows no sharp diffraction peak characteristic of crystals. On the other hand, when the zeolite is in a crystalline form, an X-ray powder diffraction pattern thereof shows sharp diffraction peaks characteristic of crystals. The peak intensity is increased with the increase of the crystallinity of the zeolite. When the zeolite is in a completely crystalline form, no further increase is observed in peak intensity.

The semicrystalline zeolite dispersed in the nucleating slurry to be provided in step (1) of the method of the present invention exhibits in a dry solid form peaks ascribed to interplanar spacings of $11.1 \pm 0.2$, $10.1 \pm 0.2$, $3.85 \pm 0.07$, $3.74 \pm 0.05$ and $3.72 \pm 0.05$ angstroms in an X-ray powder diffraction pattern.

Recognition of the crystalline state of the zeolite can conveniently be made by another method, which is the BET nitrogen adsorption method. The crystalline state of the zeolite can be evaluated by the surface area determined according to the isotherm equation of S. Brunauer, P. Emmett and E. Teller [see JACS, 60, 309 (1938)]. The BET nitrogen adsorption method is the most conventional method for determining the surface area of a porous material.

The surface area measured according to the BET nitrogen adsorption method is about 100 m²/g or less, when the zeolite of the ZSM-5 family is in a completely amorphous form. On the other hand, it is about 250 m²/g or more, when the zeolite of the ZSM-5 family is in a completely crystalline form.

The semicrystalline zeolite dispersed in the nucleating slurry to be provided in step (1) of the method of the present invention has a surface area of from 100 to less than 250 m²/g, preferably from 100 to 200 m²/g, as measured by the BET nitrogen adsorption method. Most preferably, a portion of the first precursory slurry mixture obtained in step (3) is recycled from step (3) to step (1) and used as the nucleating slurry.

The advantage of the use of the nucleating slurry in the formation of the first precursory slurry mixture resides in that control of crystallization rate is facilitated, thereby making it easy to stably obtain a desired first precursory slurry mixture, which contains a precursory zeolite having a surface area of from 100 to 200 m²/g as measured by the BET nitrogen adsorption method, with high reproducibility.

In step (2) of the method of the present invention, the nucleating slurry is mixed with a first raw material mixture comprised of a silica source, an alumina source, an alkali metal source and water to obtain a preliminary slurry mixture. The silica source, the alumina source and the alkali metal source are not particularly limited, and any of those generally employed for the production of the ZSM-5 family zeolites can be used in the present invention.

Representative examples of silica sources include an aqueous sodium silicate solution, silica sol, silica gel and organic silicate esters. Most preferred is an aqueous sodium silicate solution.

Representative examples of alumina sources include aluminum sulfate, aluminum nitrate, sodium alminate and alumina powder. Preferred are aluminum sulfate and sodium alminate. Most preferred is aluminum sulfate.

Representative examples of alkali metal sources include alkali metal hydroxides, such as sodium hydroxide and potassium hydroxide, and alkali metal salts, such as sodium chloride and sodium nitrate. Most preferred is sodium hydroxide.

The amount of water is not particularly limited as long as ZSM-5 family zeolites are successfully produced. However, the use of too small an amount of water is likely to unfavorably form a gel having an extremely high viscosity. On the other hand, the use of too large an amount of water is unfavorable because productivity becomes low. Generally, the amount of water is chosen so as for the resultant first precursor slurry mixture to have a zeolite concentration of from 2 to 15% by weight, preferably from 3 to 10% by weight, more preferably from 3 to 8% by weight.

The preliminary slurry mixture obtained in step (2) is preferably subjected to a pH adjustment so as to have a pH value of from 10 to 12, preferably from 10.5 to 12. For the pH adjustment, an acid, such as sulfuric acid, nitric acid and hydrochloric acid, is added according to necessity. Of these acids, sulfuric acid is the most preferred. The amount of the acid depends on the alkali content of the first raw material mixture.

In the first raw material mixture, the molar ratio of $SiO_2/Al_2O_3$ is not particularly limited as long as ZSM-5 family zeolites are successfully produced. However, it is generally in the range of from 20 to 500, preferably from 20 to 100, and most preferably from 25 to 40.

In the most desirable first raw material mixture, the silica source is an aqueous sodium silicate solution, the alumina source is aluminum sulfate, and the alkali metal source is sodium hydroxide. Preferably, sulfuric acid is added as an agent for pH adjustment. The proportions of the components of the first raw material mixture are preferably chosen so as to satisfy the following relationships:

Molar ratio of $SiO_2/Al_2O_3 = 20-50$,
Molar ratio of $Na_2O/SiO_2 = 0.2-0.4$, and
Molar ratio of $SO_4^{2-}/SiO_2 = 0.1-0.3$.

More preferably, the proportions of the components of the first raw material mixture are chosen so as to satisfy the following relationships:

Molar ratio of $SiO_2/Al_2O_3 = 25-40$,
Molar ratio of $Na_2O/SiO_2 = 0.2-0.3$, and
Molar ratio of $SO_4^{2-}/SiO_2 = 0.15-0.25$.

In step (2) of the method of the present invention, the nucleating slurry is preferably mixed with the first raw material mixture in a weight proportion of from 1:9 to 2:3, more preferably from 3:17 to 37:63, and most preferably from 1:4 to 7:13, to obtain a preliminary slurry mixture.

The preliminary slurry mixture thus obtained is heated under agitation to effect a hydrothermal reaction in step (3) of the method of the present invention, thereby forming a first precursory slurry mixture. The temperature for the hydrothermal reaction is not particularly limited as long as ZSM-5 family zeolites are successfully produced. However, too high a temperature is likely to cause too rapid crystallization, so that it becomes difficult to stop crystallization at a desired crystallinity. Therefore, the temperature is generally in the range of from 100° to 180° C., preferably from 120° to 170° C., and more preferably from 130° to 170° C.

The agitation method of the preliminary slurry mixture in step (3) is not particularly limited. However, the agitation is preferably performed at an agitation power of from 0.1 to 10 kw/m³, and more preferably from 0.4 to 3 kw/m³.

The first precursory slurry mixture formed in step (3) of the method of the present invention comprises a precursory zeolite dispersed in an aqueous medium. The precursory zeolite exhibits in a dry solid form peaks ascribed to interplanar spacings of 11.1±0.2, 10.1±0.2, 3.85±0.07, 3.74±0.05 and 3.72±0.05 angstroms in an X-ray powder diffraction pattern, which are characteristic of zeolites of the ZSM-5 family, and has a surface area of from 100 to 200 m²/g as measured by the BET nitrogen adsorption method.

When the surface area is less than 100 m²/g and an X-ray powder diffraction pattern shows that the precursory zeolite is in substantially a completely amorphous form, the crystallization in step (5) is slow, and a zeolite obtained in step (5) becomes unfavorably nonuniform.

On the other hand, when the surface area of the precursory zeolite measured by the BET nitrogen adsorption method exceeds 200 m²/g (which means a completely crystallized state), the crystallization in step (5) is also slow, a zeolite obtained in step (5) becomes unfavorably as large as several microns to several tens of microns, and the above-mentioned ratio of the number of external surface acid sites to the total number of acid sites of the obtained zeolite is unfavorably less than 0.03. In this connection, it should be noted that such a completely crystallized zeolite (which has been employed as seeds in the prior art) must not be used in the present invention, because undesirably large particles of zeolite are produced.

As apparent from the above, the characteristics of the first precursory slurry mixture are extremely important in the present invention.

Figure 1:
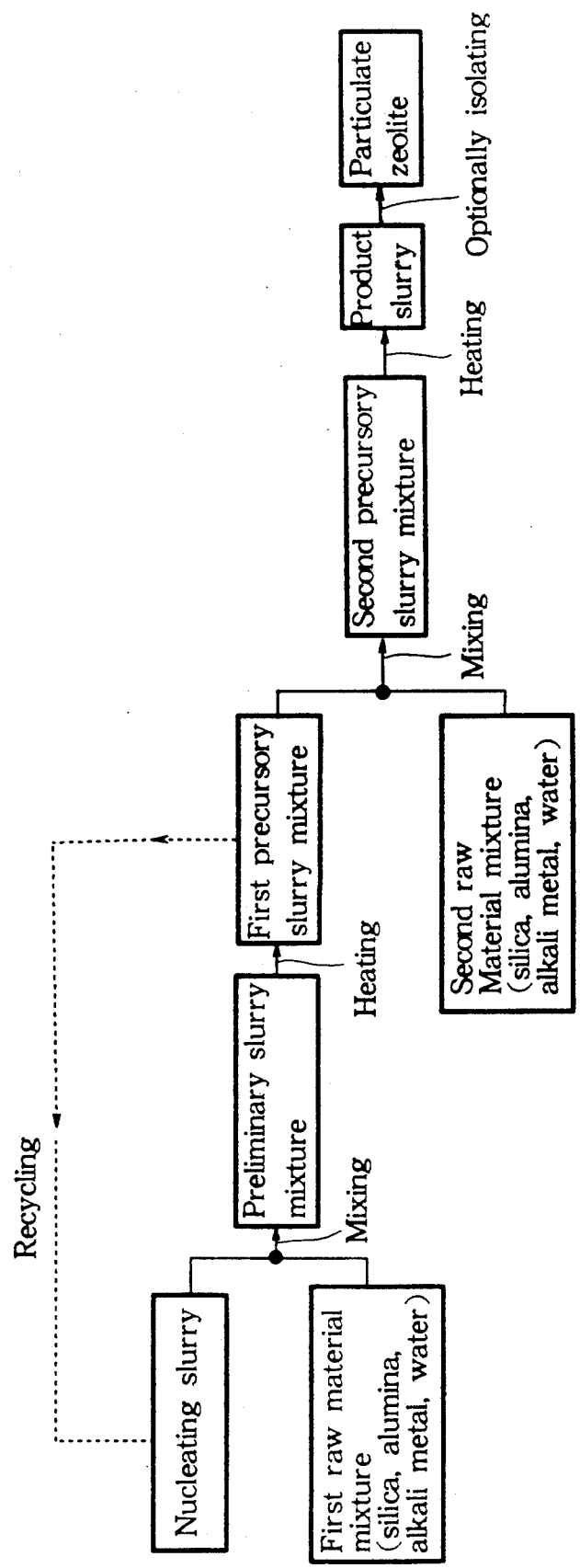
FIG. 1 is a flow chart in which solid lines indicate the steps of a representative mode of the method for producing a particulate zeolite according to the present invention while solid lines plus broken lines indicate the steps of a preferred mode of the method for producing a particulate zeolite according to the present invention.
Figure 2:
FIG. 2 is a scanning electron photomicrograph of a precursory zeolite in the dry state, which is dispersed in a first precursory slurry mixture formed in step (3) of the method of the present invention.

The precursory zeolite dispersed in the first precursory slurry mixture formed in step (3) of the method of the present invention is different in morphology and effects from a simple mixture of an amorphous zeolite and a highly crystalline zeolite. FIG. 2 is a scanning electron photomicrograph of the precursory zeolite in the dry state. As apparent from FIG. 2, the precursory zeolite is an entirely homogeneous, uniform, low crystalline substance having a smooth, round surface.

Figure 3:
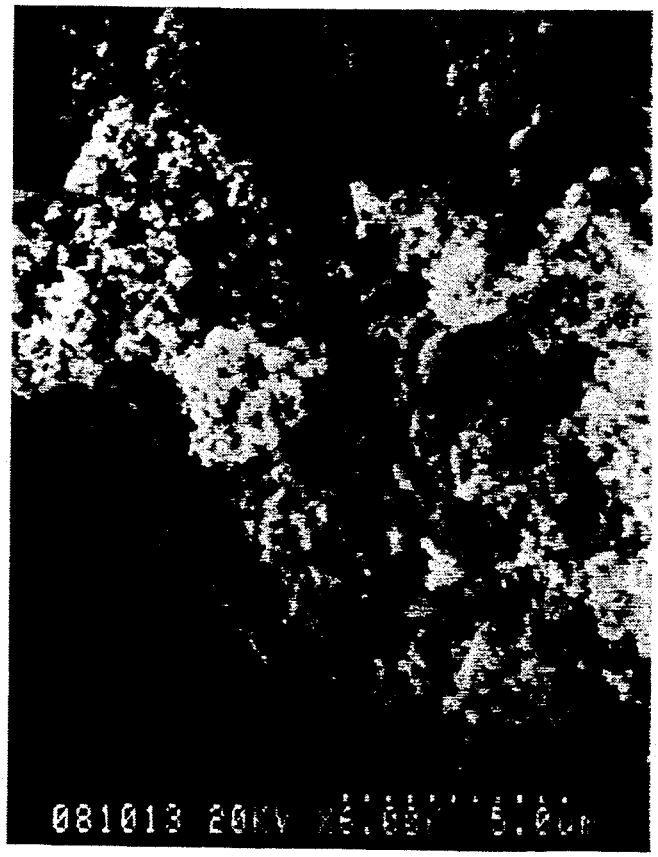
FIG. 3 is a scanning electron photomicrograph of a mixture in the dry state of a highly crystalline zeolite and a pre-crystallization amorphous zeolite, shown for the purpose of comparison between the microscopically observed configuration characteristic of the precursory zeolite shown in FIG. 2 and that of the simple mixture of a crystalline zeolite and an amorphous zeolite.

On the other hand, FIG. 3 is a scanning electron photomicrograph of a mixture of a highly crystalline zeolite and a pre-crystallization amorphous zeolite in the dry state, which mixture has substantially the same surface area (measured by the BET nitrogen adsorption method) as that of the precursory zeolite shown in FIG.

2. FIG. 3 clearly shows a heterogeneous, simple mixture comprised of crystals having a surface covered with granular gel.

When the above-mentioned simple mixture of a highly crystalline zeolite and a pre-crystallization amorphous zeolite is employed instead of a semicrystalline zeolite in step (1) of the method of the present invention and mixing of step (2) and heating of step (3) are carried out, the hydrothermal reaction accompanied by crystallization of a zeolite produced by the reaction in step (3) is extremely slow with poor reproducibility of the crystallization rate of the zeolite, so that it is difficult to obtain the desired first precursory slurry mixture in step (3). Further, when the above-mentioned simple mixture is employed instead of a first precursory slurry mixture in step (4) of the method of the present invention and heating of step (5) is carried out, only non-uniform zeolite particles in a slurry form are produced in step (5). Therefore, the intended effects of the present invention cannot be obtained by the use of the simple mixture of a highly crystalline zeolite and a pre-crystallization amorphous zeolite.

The reason why control of zeolite crystallization rate is facilitated by the addition of the nucleating slurry in the production of the first precursory slurry mixture, and the reason why a particulate zeolite is effectively produced by the addition of the first precursory slurry mixture in the production of the product slurry, have not yet been elucidated. However, the following presumptions can be made.

In the present invention, it is believed that the nucleating slurry and the first precursory slurry mixture are partially or wholly dissolved in a hydrothermal reaction system to thereby form an extremely small crystal nucleus or crystal precursor. That is, it is believed that they function as an agent for creating crystal nuclei. In the production of fine particles of a zeolite, it is advantageous to create a large number of nuclei promptly. From this viewpoint, it is most desired to dissolve a highly crystalline substance at a high rate. Actually, however, the dissolution rate of highly crystalline substances is small, so that crystallization rate is small and only large zeolite particles are obtained, as mentioned before. On the other hand, the dissolution rate of amorphous substances is very large. However, the amount of nuclei created by the dissolution of amorphous substances is small, so that crystallization rate is small and reproducibility of crystallization is poor, as also mentioned before. In contrast to such highly crystalline substances and amorphous substances, the nucleating slurry and the first precursory slurry mixture to be used in the method of the present invention have such an appropriate crystallinity that a large number of nuclei are created by the dissolution thereof, and that still the dissolution rate is large as compared to that of complete crystals. Accordingly, a large number of nuclei would advantageously be promptly created in step (2) by virtue of the use of the nucleating slurry and in step (4) by virtue of the use of the first precursory slurry mixture.

Moreover, it has become apparent by the investigations of the present inventors that with respect to the nucleating slurry and the first precursory slurry mixture used in the present invention, not only the solid contained therein but also the components dissolved in the aqueous medium play an important role in the hydrothermal reaction accompanied by the crystallization of a zeolite. The above-mentioned dissolved components are those which are present in a filtrate obtained by filtering each of the nucleating slurry and the first precursory slurry mixture, which filtering is generally conducted at a temperature of from 20° to 50 °C.

Surprisingly, it has also been found that the intended effects of the present invention can be achieved even by the use of only the above-mentioned filtrate obtained by filtering each of the nucleating slurry and the first precursory slurry mixture, in place of the nucleating slurry in step (2) and the first precursory slurry mixture in step (4). This is believed to be due to the presence of zeolite nuclei in the filtrate. More surprisingly, it has been found that when the concentration of $SiO_2$ in the filtrate is in the range of from 0.5 to 5% by weight, preferably from 1 to 3% by weight, the effects desired in the present invention are strikingly manifest.

As apparent from the above, the nucleating slurry and the first precursory slurry mixture to be used in the present invention are clearly different in action and effects from the crystal seeds known in the art.

The nucleating slurry is obtained by stopping crystallization at such a desired crystallinity as exhibits a surface area (measured by the BET nitrogen adsorption method) of from 100 to less than 250 $m^2/g$ in the conventional method (as set out hereinbefore) for producing zeolites of the ZSM-5 family. The stopping of the crystallization can be effected by cooling the reaction system. From the viewpoint of attaining the desired reproducibility of the formation of the first precursory slurry mixture, it is preferred that a portion of the first precursory slurry mixture obtained in step (3) be recycled from step (3) to step (1) and used as the nucleating slurry in step (1) while the remaining portion of the first precursory slurry mixture is subjected to the mixing in step (4).

In step (3) of the method of the present invention, crystallization is stopped at such a desired crystallinity as exhibits a surface area (measured by the BET nitrogen adsorption method) of from 100 to 200 $m^2/g$ by cooling. Preferably, an aliquot is intermittently sampled from the preliminary slurry mixture being heated for hydrothermal reaction, and subjected to X-ray powder diffraction analysis. The crystallinity of the zeolite dispersed in the sampled preliminary slurry mixture is evaluated by a percentage of the intensity of a peak ascribed to interplanar spacing $d = 3.85 \pm 0.07$ angstroms, which is a main peak among those characteristic of zeolites of the family of ZSM-5, relative to the intensity of the corresponding peak observed in an X-ray powder diffraction pattern of a completely crystallized form of the ZSM-5 family zeolite. The crystallinity correlates with the surface area measured by the BET nitrogen adsorption method. However, since the peak intensity in an X-ray powder diffraction pattern depends on not only the crystallinity but also the particle size, the results of X-ray powder diffraction analysis are not completely in agreement with the results of the measurement of the surface area according to the BET nitrogen adsorption method. Nevertheless, X-ray powder diffraction analysis provides a convenient means for evaluating the crystallinity of zeolites. Generally, the hydrothermal reaction for crystallization in step (3) is stopped by cooling to about 30° C. at a crystallinity of from 5 to 60% as evaluated by the above-mentioned X-ray powder diffraction analysis in order to ensure that the desired first precursory slurry mixture contains a precursory zeolite having a surface area of from 100 to 200 $m^2/g$ as measured by the BET nitrogen adsorption method.

In step (4) of the method of the present invention, at least a portion of the first precursory slurry mixture is mixed with a second raw material mixture comprised of a silica source, an alumina source, an alkali metal source and water to obtain a second precursory slurry mixture.

The description made hereinbefore with respect to the first raw material mixture applies to the preparation, the pH adjustment and the component proportion of the second raw material mixture.

In step (4), the ratio of the first precursory slurry mixture to the second raw material mixture is not critical. However, when the ratio is too small, the effect of the first precursory slurry mixture mixed in step (4) are not manifest, so that the reproducibility of the hydrothermal reaction accompanied by the crystallization of a zeolite formed thereby is poor in step (5), thereby rendering the production of fine particles difficult. On the other hand, too large a ratio is disadvantageous from the viewpoint of the productivity of a desired zeolite of the ZSM-5 family. Accordingly, the first precursory slurry mixture is generally mixed with the second raw material mixture in a weight proportion of from 1:9 to 2:3, preferably from 3:17 to 37:63, and most preferably from 1:4 to 7:13.

It is preferred that the composition of the second precursory slurry mixture be substantially identical with that of the first precursory slurry mixture from the viewpoint effective production of fine particles of the desired final zeolite with high reproducibility.

The first raw material mixture for use in step (2) and the second raw material mixture for use in step (4) may each contain no organic material or, may each further comprise an organic material. The type of the organic material for use in the present invention is not critical, and any of the organic materials employed in the conventional method for producing ZSM-5 family zeolites can be used. Representative examples of organic materials include quaternary ammonium salts, such as tetrapropylammonium salts, diamines, such as hexamethylenediamine, alcohols, such as ethanol and ethylene glycol, lower alkylureas, and lower alkylthioureas. Of these, lower alkylureas and lower alkylthioureas are preferred, and lower alkylureas are most preferred.

In the present invention, desired fine particles of a zeolite of the ZSM-5 family, for example, zeolite having a particle size of 0.1–1.0 μm or less are obtained without the use of the organic material. However, depending on reaction systems, the addition of the organic material may be preferred to stably produce such fine particles of a ZSM-5 zeolite and to improve the selectivity of a specific species of ZSM-5 zeolite.

In step (5) of the method of the present invention, the second precursory slurry mixture obtained in step (4) is heated to effect a hydrothermal reaction until a product slurry comprising a desired particulate zeolite dispersed in an aqueous medium is obtained, the particulate zeolite exhibiting in a dry solid form peaks ascribed to interplanar spacings of $11.1\pm0.2$, $10.1\pm0.2$, $3.85\pm0.07$, $3.74\pm0.05$ and $3.72\pm0.05$ angstroms in an X-ray powder diffraction pattern and having a surface area of at least 250 m$^2$/g as measured by the BET nitrogen adsorption method.

The hydrothermal reaction of the second precursory slurry mixture is generally conducted at a temperature of from 100° to 200° C., preferably from 120° to 190° C., and most preferably from 130° to 180° C.

The hydrothermal reaction of the second precursory slurry mixture may be stationally performed, or performed under agitation. When it is preformed under agitation, the agitation power is not particularly limited. However, the agitation power is generally in the range of from 0.1 to 10 kw/m$^3$, preferably from 0.4 to 3 kw/m$^3$.

The product slurry as such may be used in the ultimate application, e.g., as a catalyst as described below. However, optionally, the particulate zeolite may be isolated from the product slurry. The isolation of the particulate zeolite may be readily performed by conventional methods. For example, the particulate zeolite is readily isolated by filtering the product slurry to obtain a cake, washing the cake and drying the washed cake.

The particulate zeolites of the ZSM-5 family produced by the method of the present invention can advantageously be employed, for example, as an adsorbent and a catalyst.

Fine particles of a zeolite are produced by the present invention. Fine particles are preferred from the viewpoint that catalytic activity is improved and that catalyst life is prolonged.

The particulate zeolite of the present invention advantageously catalyzes an alkylation, a disproportionation, a cyclization, a cracking, an isomerization, a halogenation, an amination, a nitration, a hydration and a dehydration of hydrocarbons. In these reactions, irrespective of a gas phase or a liquid phase, the particulate zeolite of the present invention exhibits excellent catalytic activity for a prolonged period of time.

Especially, fine particles of a zeolite according to the present invention are useful as an active catalyst in relatively low temperature, liquid phase reactions, in which dispersion of a zeolite as a catalyst is a critical factor.

Representative examples of such relatively low temperature, liquid phase reactions include a liquid phase hydration of olefins, an esterification of an acid and an alcohol, a hydrolysis of esters, formaldehyde condensation, a trioxane systehsis from formaldehyde, a bisphenol-A synthesis from phenol and acetone and acetal formation.

In particular, the effects of fine particles of a ZSM-5 family zeolite according to the present invention are manifest in a liquid phase hydration of olefins. Further, the effects of fine particles of a ZSM-5 family zeolite according to the present invention are most manifest in a hydration of a cyclic olefin, such as cyclohexene, in which dispersion of a zeolite as a catalyst is the most critical factor.

PREFERRED EMBODIMENT OF THE INVENTION

The present invention will now be further illustrated in more detail with reference to the following Examples which should not be construed to be limiting the scope of the present invention.

EXAMPLE 1

(1) Production of nucleating slurry

To 8.0 kg of an aqueous sodium silicate solution (SiO$_2$: 26% by weight, Na$_2$O: 7.0% by weight) are added 0.05 kg of sodium hydroxide and 4 kg of water. To the resultant solution, a solution obtained by dissolving 0.61 kg of aluminum sulfate [Al$_2$(SO$_4$)$_3$.16H$_2$O] and 0.1 kg of 1,3-dimethylurea in 15 kg of water is added under agitation, and further 10 kg of 5% by weight sulfuric acid is added, thereby obtaining a homogeneous gel. The thus obtained homogeneous gel is charged into an autoclave having a capacity of 50 liters, and then heated at 160° C. for 10 hours under agitation at an agitation power of from 0.5 to 1 kw/m³ to thereby effect a hydrothermal reaction. Thus, a nucleating slurry is obtained.

Figure 4:
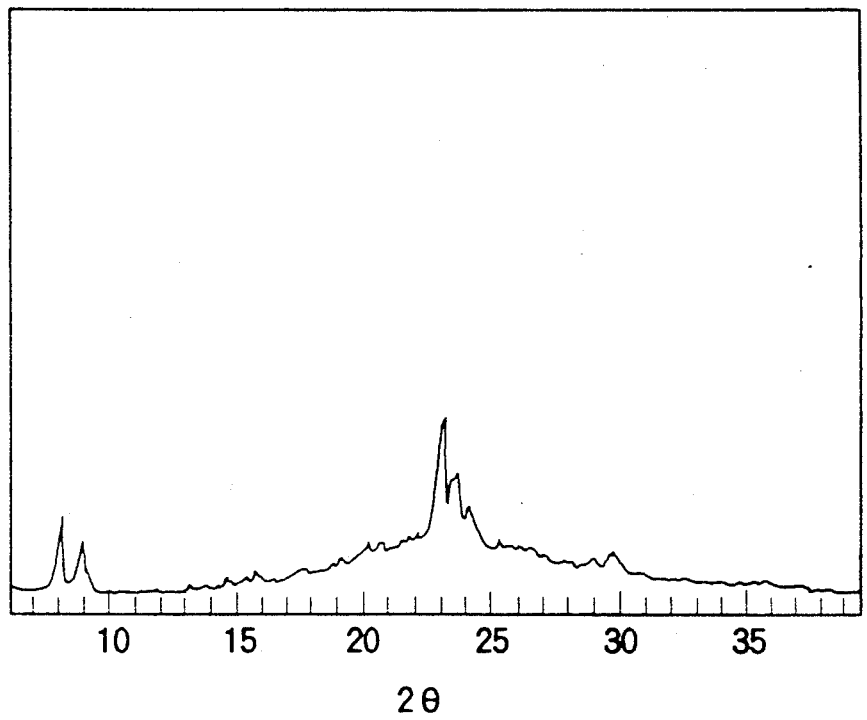
FIG. 4 shows an X-ray powder diffraction pattern of a semicrystalline zeolite in the dry state, which is dispersed in a nucleating slurry obtained in Example 1.

A portion of the obtained nucleating slurry is filtered at 30° C., and the resultant cake is dried at 120° C. for 8 hours to obtain a semicrystalline zeolite. An X-ray powder diffraction pattern of the thus obtained semicrystalline zeolite is shown in FIG. 4. It is found that this X-ray powder diffraction pattern indicates peaks ascribed to interplanar spacings of 11.1±0.2, 10.1±0.2, 3.85±0.07, 3.74±0.05 and 3.72±0.05 angstroms which are characteristic of a zeolite of the ZSM-5 family. Further the surface area of this semicrystalline zeolite measured by the BET nitrogen adsorption method is 120 m²/g. The concentration of $SiO_2$ in the filtrate obtained in the above-mentioned filtration is measured by ICP (plasma emission spectrometry) to find that it is 1.5% by weight.

(2) Production of first precursory slurry mixture

To 12.6 kg of the nucleating slurry produced in item (1) above are added 5.3 kg of the above-mentioned aqueous sodium silicate solution, 0.03 kg of sodium hydroxide and 2.67 kg of water. To the resultant solution, a solution obtained by dissolving 0.41 kg of aluminum sulfate [$Al_2(SO_4)_3.16H_2O$] and 0.06 kg of 1,3-dimethylurea in 10 kg of water is added under agitation, and further 6.67 kg of 5% by weight sulfuric acid is added, thereby obtaining a homogeneous gel having a pH value of 11.5. The thus obtained homogeneous gel is charged into an autoclave having a capacity of 50 liters, and then heated at 150° C. for 8 hours under agitation at an agitation power of from 0.5 to 1 kw/m³ to thereby effect a hydrothermal reaction. Thus, a first precursory slurry mixture is obtained.

Figure 5:
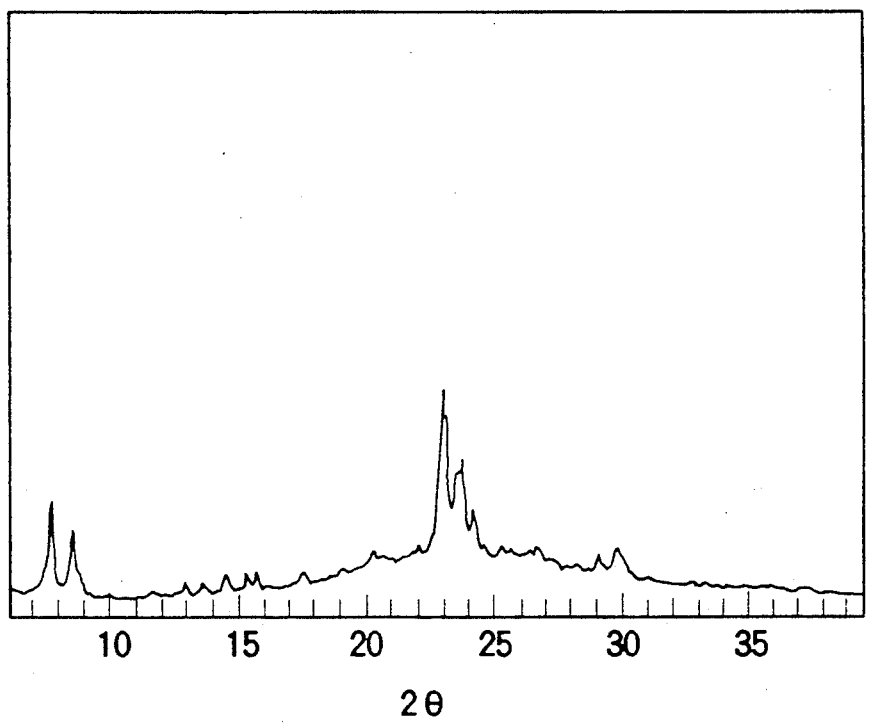
FIG. 5 shows an X-ray powder diffraction pattern of a precursory zeolite in the dry state, which is dispersed in the first precursory slurry mixture produced in Example 1.

A portion of the obtained first precursory slurry mixture is filtered at 30° C., and the resultant cake is dried at 120° C. for 8 hours to obtain a precursory zeolite. An X-ray powder diffraction pattern of the thus obtained precursory zeolite is shown in FIG. 5. It is found that this X-ray powder diffraction pattern indicates peaks characteristic of a zeolite of the ZSM-5 family. Further, the surface area of this precursory zeolite measured by the BET nitrogen adsorption method is 150 m²/g. The concentration of $SiO_2$ in the filtrate obtained in the above-mentioned filtration is 1.6% by weight.

(3) Production of product slurry

A product slurry having a pH value of 11.6 is obtained in substantially the same manner as described in item (2) above, except that 12.6 kg of the first precursory slurry mixture produced in item (2) above is used in place of the nucleating slurry, and that heating at 150° C. is conducted for 30 hours to thereby crystallize the precursory zeolite.

Figure 6:
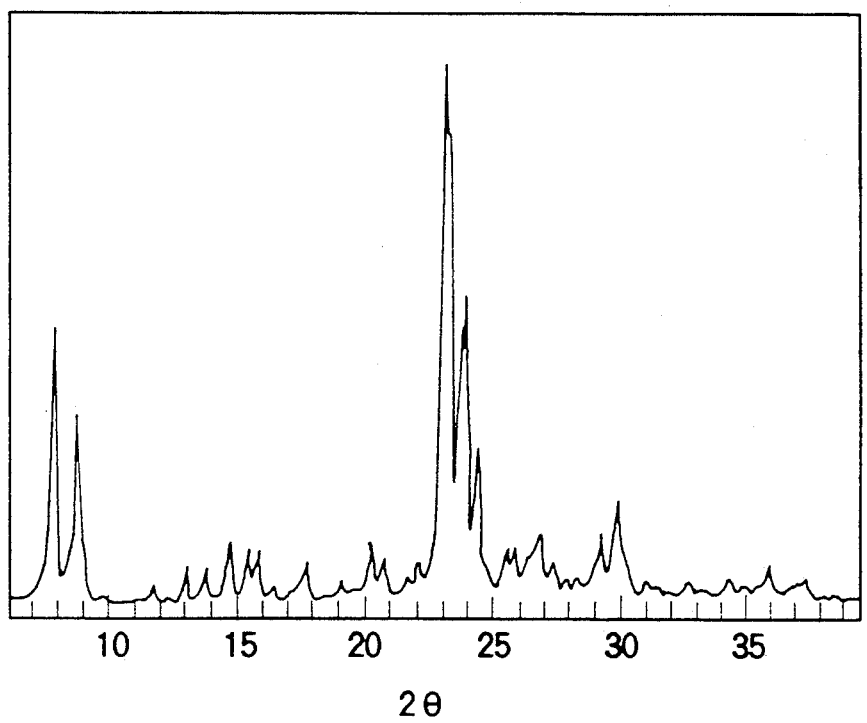
FIG. 6 shows an X-ray powder diffraction pattern of a particulate zeolite obtained by successively subjecting the product slurry produced in Example 1 to filtration, water washing and drying.

The obtained product slurry is filtered, and the resultant cake is washed with a 5-fold volume of water, followed by drying at 120° C. for 8 hours. Thus, a particulate zeolite is obtained. An X-ray powder diffraction pattern of the obtained particulate zeolite is shown in FIG. 6. From the X-ray powder diffraction pattern, it is apparent that the particulate zeolite is a zeolite of the ZSM-5 family.

Figure 7:
FIG. 7 is a scanning electron photomicrograph of a particulate zeolite present in the product slurry obtained in Example 1.

Also, a scanning electron photomicrograph of the particulate zeolite is shown in FIG. 7. As is apparent from FIG. 7, the produced zeolite is in the form of rods, and the thickness of the narrowest portion thereof is 0.4 μm or less.

Moreover, the dried particulate zeolite is calcined in circulating air at 500° C. for 6 hours. The calcined zeolite is put in 1N nitric acid to form a 10% by weight slurry and heated at 60° C. for 4 hours to effect an ion exchange. The resultant slurry is filtered, and the cake is washed with 5-fold volume of water, followed by drying at 120° C. for 10 hours to thereby obtain a particulate zeolite in an H form. The number of acid sites of the particulate zeolite is measured by the amine adsorption method described hereinbefore. As a result, it is found that the ratio of the number of external surface acid sites to the total number of acid sites is 0.10.

EXAMPLE 2

(1) Production of first precursory slurry mixture

To 11.6 kg of the first precursory slurry mixture obtained in item (2) of Example 1 are added 5.6 kg of the same aqueous sodium silicate solution as used in Example 1 and 6.9 kg of water. The resultant solution is placed in an autoclave having a capacity of 50 liters, and a solution obtained by dissolving 0.3 kg of aluminum sulfate [$Al_2(SO_4)_3.16H_2O$] and 10 g of 1,3-dimethylurea in 10 kg of water is added to the solution placed in the autoclave by means of a pump over a period of 20 minutes under agitation at an agitation power of from 0.5 to 0.8 kw/m³. Further, 7.6 kg of 4.6% by weight sulfuric acid is fed by means of the pump over a period of 10 minutes, thereby obtaining a homogeneous gel. The thus obtained homogeneous gel is then heated at 180° C. for 4 hours to thereby effect hydrothermal reaction. Thus, a first precursory slurry mixture is obtained.

The obtained first precursory slurry mixture is cooled to 30° C., and then a portion thereof is filtered, followed by drying at 120° C. for 8 hours to obtain a precursory zeolite. An X-ray powder diffraction pattern thereof corresponds to that of a zeolite of the ZSM-5 family. The surface area of this precursory zeolite measured by the BET nitrogen adsorption method is 180 m²/g.

(2) Production of product slurry

To 11.6 kg of the first precursory slurry mixture obtained in item (1) above are added 5.6 kg of the above-mentioned aqueous sodium silicate solution and 6.9 kg of water. The resultant solution is placed in an autoclave having a capacity of 50 liters and a solution obtained by dissolving 0.3 kg of aluminum sulfate [$Al_2(SO_4)_3.16H_2O$] and 10 g of 1,3-dimethylurea in 10 kg of water is added to the solution placed in the autoclave by means of a pump over a period of 15 minutes under agitation at an agitation power of from 0.4 to 0.7 kw/m³. Further, 7.6 kg of 4.6% by weight sulfuric acid is fed by means of the pump over a period of 10 minutes, thereby obtaining a homogeneous gel. The thus obtained homogeneous gel is then heated at 155° C. for 22 hours to thereby crystallize the precursory zeolite. Thus, a product slurry is obtained.

Figure 8:
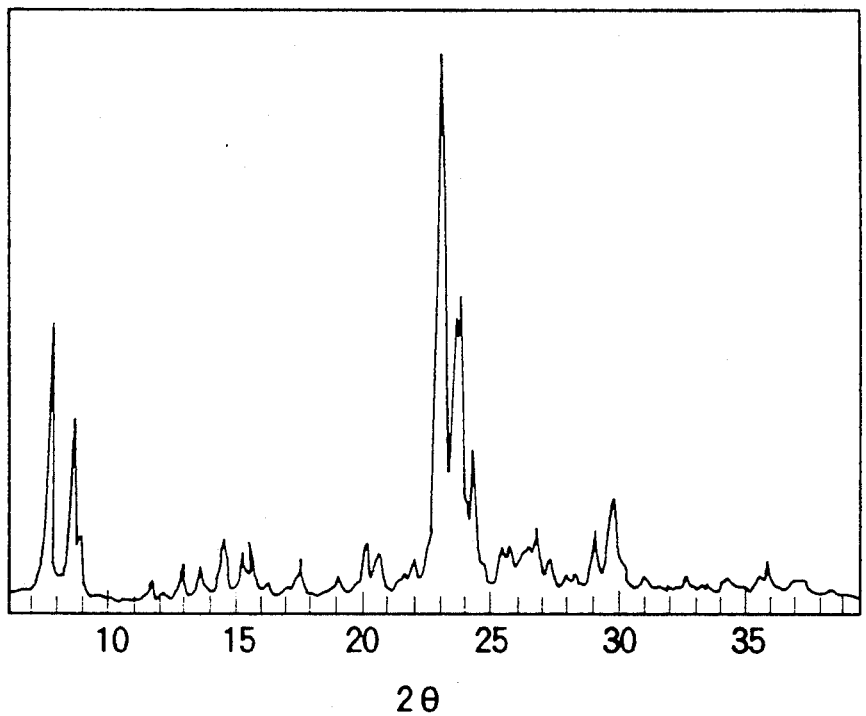
FIG. 8 shows an X-ray powder diffraction pattern of a particulate zeolite obtained by successively subjecting the product slurry produced in Example 2 to filtration, water washing and drying.
Figure 9:
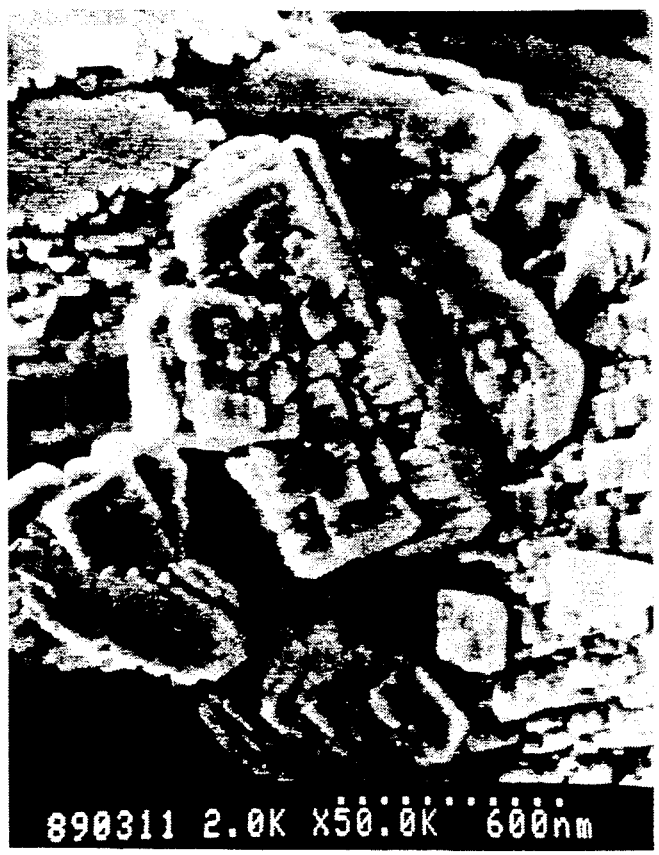
FIG. 9 is a scanning electron photomicrograph of a particulate zeolite present in the product slurry obtained in Example 2.

The obtained product slurry is filtered, and the resultant cake is washed with a 5-fold volume of water, followed by drying at 120° C. for 8 hours. Thus, a particulate zeolite is obtained. An X-ray powder diffraction pattern thereof is shown in FIG. 8. The X-ray powder diffraction pattern corresponds to that of a zeolite of the ZSM-5 family. The surface area of this particulate zeolite measured by the BET nitrogen adsorption method is 300 m²/g. A scanning electron photomicrograph thereof is shown in FIG. 9. As observed from FIG. 9, the produced zeolite is comprised of particles of about 0.5 μm in particle size with a rough surface.

The particulate zeolite is changed to an H form in substantially the same manner as in Example 1. The ratio of the number of external surface acid sites to the total number of acid sites measured by the amine adsorption method is 0.15.

EXAMPLE 3

(1) Production of first precursory slurry mixture

To 11.6 kg of the first precursory slurry mixture obtained in item (1) of Example 2 are added 5.7 kg of the same aqueous sodium silicate solution as employed in Example 1 and 2.2 kg of water, thereby obtaining a homogeneous slurry. To the resultant slurry, a solution obtained by dissolving 0.42 kg of aluminum sulfate [$Al_2(SO_4)_3 \cdot 16H_2O$] in 10 kg of water is fed under agitation by means of a pump over a period of 15 minutes. Further, a solution obtained by dissolving 0.26 kg of sulfuric acid in 6 kg of water is fed by means of the pump over a period of 10 minutes to obtain a gel. The thus obtained gel is heated at 168° C. for 8 hours in an autoclave having a capacity of 50 liters to thereby effect a hydrothermal reaction. Thus, a first precursory slurry mixture is obtained.

Figure 10:
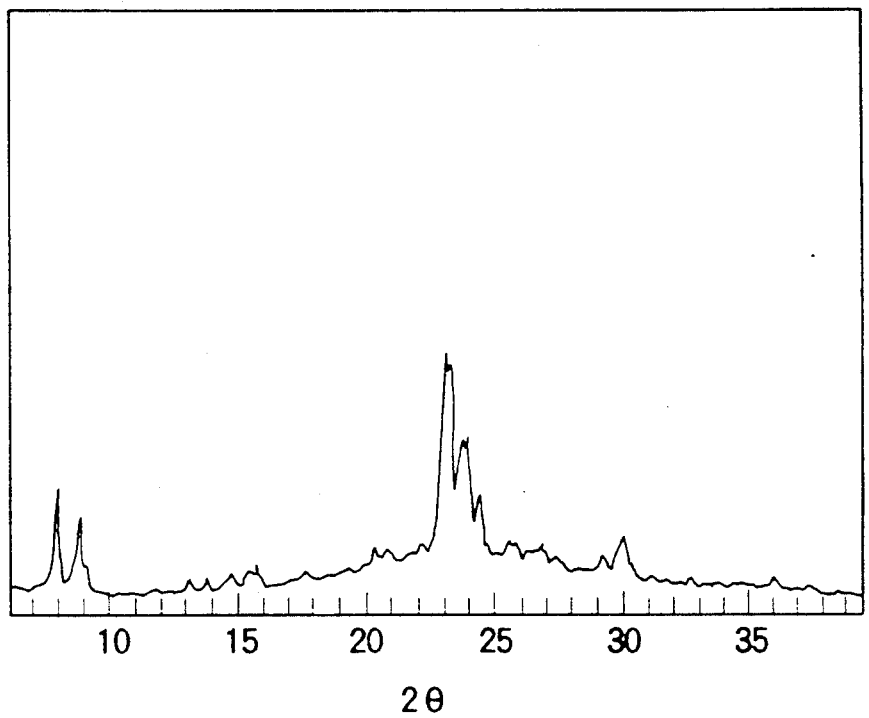
FIG. 10 shows an X-ray powder diffraction pattern of a precursory zeolite in the dry state, which is dispersed in the first precursory slurry mixture obtained in Example 3.

The obtained first precursory slurry mixture is cooled to 30° C., and a portion thereof is filtered. The resultant cake is dried at 120° C. for 8 hours to obtain a precursory zeolite. An X-ray powder diffraction pattern thereof is shown in FIG. 10. The X-ray powder diffraction pattern thereof indicates that the obtained precursory zeolite is a zeolite of the ZSM-5 family.

The surface area thereof measured by the BET nitrogen adsorption method is 153 $m^2/g$.

The concentration of $SiO_2$ in the filtrate obtained by the above-mentioned filtration is 1.25% by weight.

(2) Production of product slurry

To 11.6 kg of the first precursory slurry mixture obtained in item (1) above are added 5.7 kg of the above-mentioned aqueous sodium silicate solution and 2.2 kg of water, thereby obtaining a homogeneous slurry. To the resultant slurry, a solution obtained by dissolving 0.42 kg of aluminum sulfate [$Al_2(SO_4)_3 \cdot 16H_2O$] in 10 kg of water is fed under agitation by means of a pump over a period of 20 minutes. Further, a solution obtained by dissolving 0.26 kg of sulfuric acid in 6 kg of water is fed by means of the pump over a period of 10 minutes to obtain a gel. The thus obtained gel is charged into an autoclave having a capacity of 50 liters, and then, heated at 168° C. for 20 hours while stirring at 250 rpm to thereby effect crystallization. Thus, a product slurry is obtained.

Figure 11:
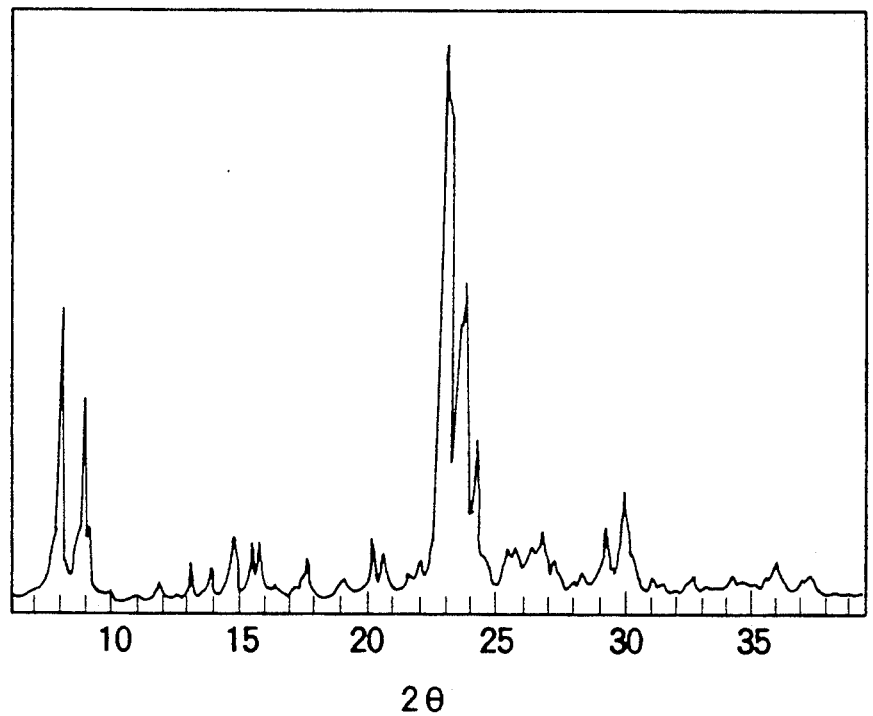
FIG. 11 shows an X-ray powder diffraction pattern of a particulate zeolite obtained by successively subjecting the product slurry produced in Example 3 to filtration, water washing and drying.
Figure 12:
FIG. 12 is a scanning electron photomicrograph of a particulate zeolite present in the product slurry obtained in Example 3.

The obtained product slurry is filtered, and the resultant cake is washed with a 5-fold volume of water, followed by drying at 120° C. for 8 hours. Thus, a particulate zeolite is obtained. An X-ray powder diffraction pattern thereof is shown in FIG. 11. From the X-ray powder diffraction pattern, the particulate zeolite is identified as a particulate zeolite of the ZSM-5 family. A scanning-type electron photomicrograph of the particulate zeolite is shown in FIG. 12. As observed from FIG. 12, the produced ZSM-5 is comprised of particles of about 1 μm in particle size with a rough surface. Further, the cake obtained by filtration and water washing is added to 1N nitric acid to form a 10% by weight slurry, which is heated at 60° C. for 4 hours to effect an ion exchange. The resultant slurry is filtered to obtain a cake, and the obtained cake is washed with a 5-fold volume of water, followed by drying at 120° C. to thereby obtain a zeolite in an H form.

Figure 13:
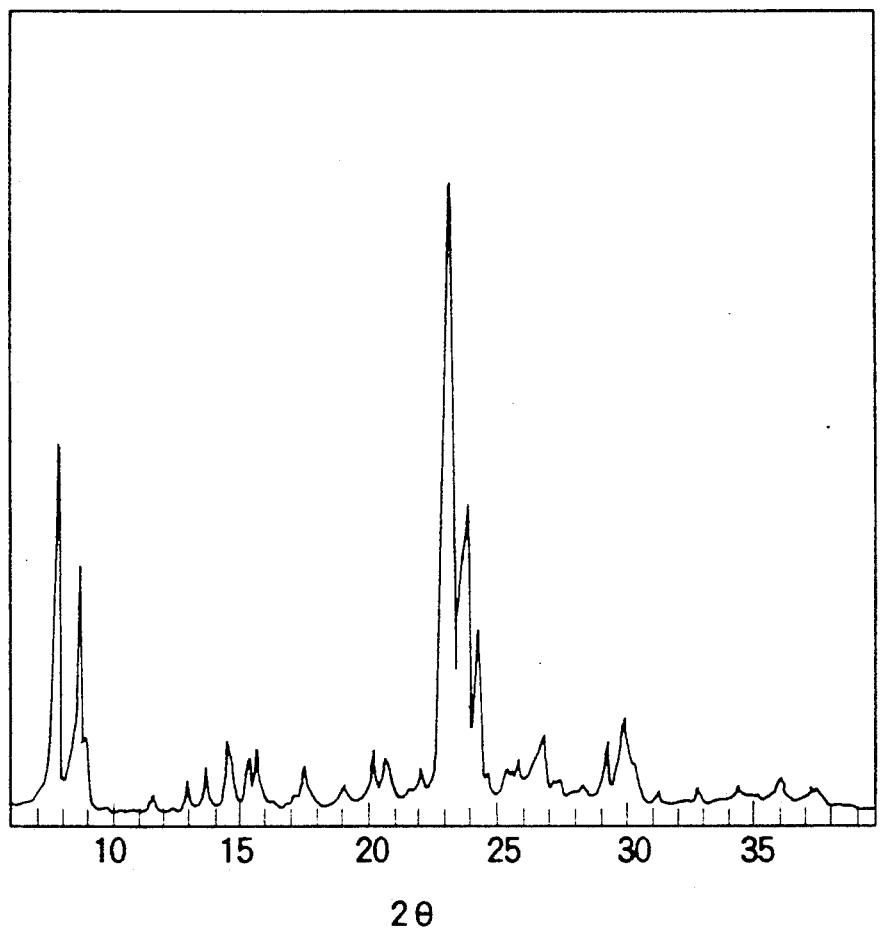
FIG. 13 shows an X-ray powder diffraction pattern of a particulate zeolite obtained by successively subjecting the product slurry produced in Example 3 to conversion to an H (proton) form, filtration, water washing and drying.

An X-ray powder diffraction pattern of the obtained zeolite in an H form is shown in FIG. 13. The ratio of the number of external surface acid sites to the total number of acid sites measured by the amine adsorption method is 0.20.

The molar ratio of $SiO_2Al_2O_3$ of this particulate zeolite measured by fluorescence X-ray analysis is 28, and the surface area measured by the BET nitrogen adsorption method is 325 $m^2/g$.

EXAMPLE 4

(1) Production of nucleating slurry

To 5.35 kg of the same aqueous sodium silicate solution used in Example 1 is added 2.5 kg of water. To the resultant solution, a solution obtained by dissolving 0.4 kg of aluminum sulfate [$Al_2(SO_4)_3 \cdot 16H_2O$] and 0.26 kg of sulfuric acid in 15 kg of water is added under agitation by means of a pump at room temperature over a period of about 30 minutes to thereby obtain a homogeneous gel. The thus obtained homogeneous gel is heated at 170° C. for 30 hours while stirring at 250 rpm to obtain a nucleating slurry containing a semicrystalline zeolite.

Figure 14:
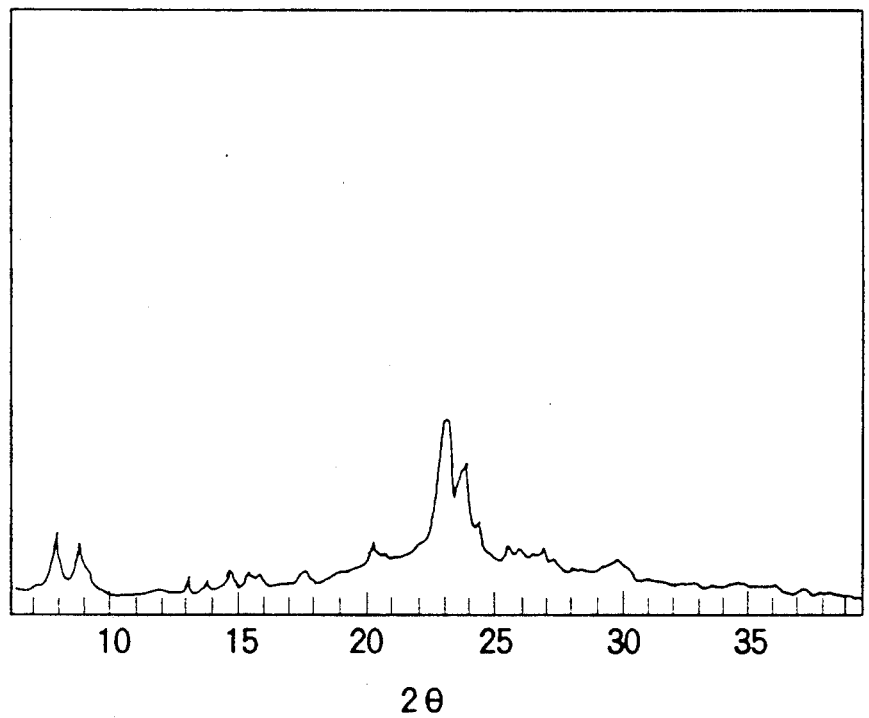
FIG. 14 shows an X-ray powder diffraction pattern of a semicrystalline zeolite in the dry state, which is dispersed in the nucleating slurry produced in Example 4.

The thus obtained nucleating slurry is cooled to 30° C., and a portion thereof is filtered, followed by drying at 120° C. for 8 hours, thereby obtaining a dry semicrystalline zeolite. An X-ray powder diffraction pattern thereof is shown in FIG. 14. The X-ray powder diffraction pattern of the semicrystalline zeolite corresponds to that of a zeolite of the ZSM-5 family.

Further, the surface area of the semicrystalline zeolite measured by the BET nitrogen adsorption method is 120 $m^2/g$.

(2) Production of first precursory slurry mixture

To 11.6 kg of the nucleating slurry obtained in item (1) above are added 5.65 kg of the above-mentioned aqueous sodium silicate solution, 30 g of sodium hydroxide and 2.2 kg of water to obtain a homogeneous slurry. The thus obtained homogeneous slurry is charged into an autoclave having a capacity of 50 liters, and then, a solution obtained by dissolving 0.42 kg of aluminum sulfate [$Al_2(SO_4)_3 \cdot 16H_2O$] in 10 kg of water is added to the slurry charged into the autoclave by means of a pump over a period of about 20 minutes while stirring at 200 rpm by means of an anchor-type agitation blade. Further, to the resultant slurry is added a solution obtained by dissolving 0.3 kg of sulfuric acid in 5 kg of water over a period of 15 minutes. The agitation power applied during the above operation has changed in the range of from 0.3 to 0.8 kw/$m^3$. Thereafter, the temperature of the mixture is elevated to 170° C., and a hydrothermal reaction is effected for 8 hours to thereby obtain a first precursory slurry mixture.

Figure 15:
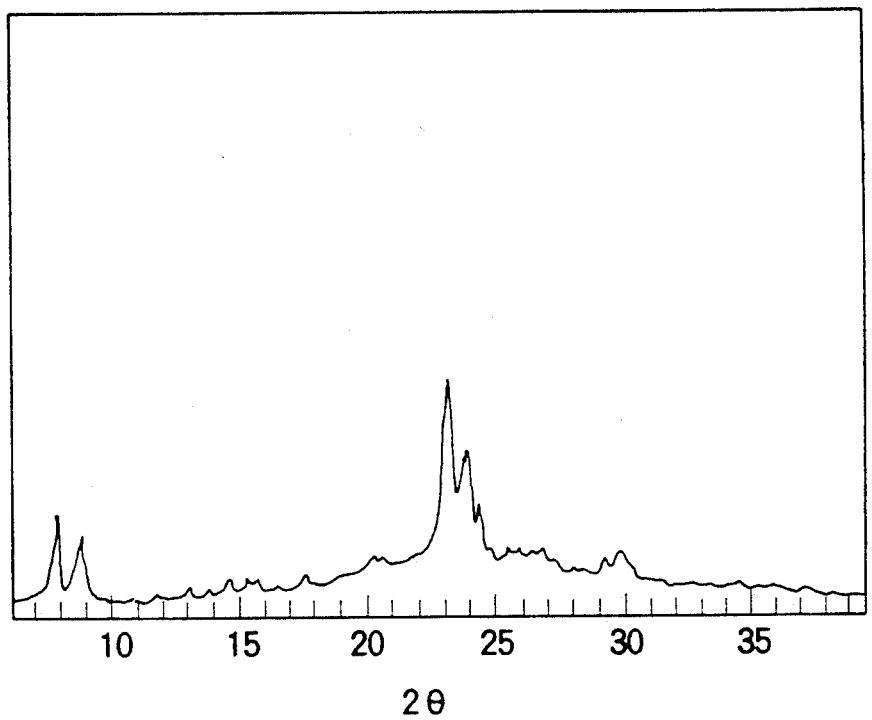
FIG. 15 shows an X-ray powder diffraction pattern of a precursory zeolite in the dry state, which is dispersed in the first precursory slurry mixture obtained in Example 4.

The obtained first precursory slurry mixture is cooled to 30° C., and a portion thereof is filtered, followed by drying at 120° C. for 8 hours to obtain a precursory zeolite. An X-ray power diffraction pattern thereof is shown in FIG. 15. The X-ray powder diffraction pattern indicates that the obtained precursory zeolite is a zeolite of the ZSM-5 family.

The surface area of the precursory zeolite measured by the BET nitrogen adsorption method is 170 $m^2/g$.

(3) Production of first precursory slurry mixture

Hydrothermal synthesis reaction is effected using substantially the same amount of raw materials and under substantially the same conditions as in item (2) above, except that 11.6 kg of the first precursory slurry mixture obtained in item (2) above is used in place of the nucleating slurry. Thus, a first precursory slurry mixture is obtained.

The thus obtained first precursory slurry mixture is cooled to 30° C., and a portion thereof is filtered, followed by drying at 120° C. for 8 hours. Thus, a precursory zeolite is produced. An X-ray powder diffraction pattern thereof corresponds to that of a zeolite of the ZSM-5 family. The surface area of the precursory zeolite measured by the BET nitrogen adsorption method is 165 m$^2$/g.

(4) Production of first precursory slurry mixture

Hydrothermal syntheses reaction is effected using substantially the same amount of raw materials and under substantially the same conditions as in item (2) above, except that 11.6 kg of the first precursory slurry mixture obtained in item (3) above is used in place of the nucleating slurry. Thus, a first precursory slurry mixture is obtained.

The thus obtained first precursory slurry mixture is cooled to 30° C., and a portion thereof is filtered, followed by drying at 120° C. for 8 hours. Thus, a precursory zeolite is obtained. An X-ray powder diffraction pattern thereof corresponds to that of a zeolite of the ZSM-5 family. The surface area of the precursory zeolite measured by the BET nitrogen adsorption method is 170 m$^2$/g.

From the results obtained in items (2), (3) and (4) above, it is apparent that the reproducibility of the first precursory slurry mixture is excellent in the method of the present invention.

(5) Production of product slurry 11.6 kg of the first precursory slurry mixture obtained in item (4) above is mixed with substantially the same amount of raw materials employed in item (2) above to thereby obtain a homogeneous gel. The molar ratios of the components of the gel are as follows: SiO$_2$/Al$_2$O$_3$=36.6, Na$_2$O/SiO$_2$=0.266 and SO$_4^{2-}$/SiO$_2$=0.200.

Figure 16:
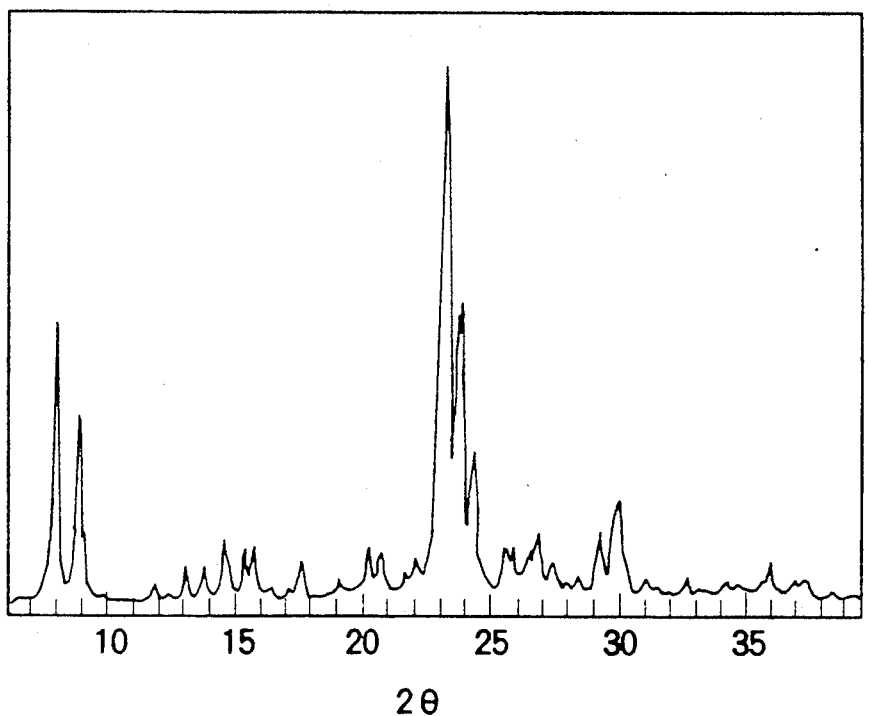
FIG. 16 shows an X-ray powder diffraction pattern of a particulate zeolite obtained by successively subjecting the product slurry produced in Example 4 to filtration, water washing and drying.

The gel is charged into an autoclave having a capacity of 50 liters, and then, heated at 150° C. for 30 hours under agitation at an agitation power of from 0.5 to 0.8 kw/m$^3$, to thereby obtain a product slurry containing a particulate zeolite. The obtained product slurry is filtered, and the resultant cake is washed with a 5-fold volume of water, followed by drying at 120° C. for 8 hours to thereby obtain a dry particulate zeolite. An X-ray powder diffraction pattern thereof is shown in FIG. 16. As observed from the X-ray powder diffraction pattern, the produced particulate zeolite is identified as a particulate zeolite of the ZSM-5 family. The molar ratio of SiO$_2$/Al$_2$O$_3$ of the particulate zeolite measured by fluorescence X-ray analysis is 28.

Further, the surface area of the particulate zeolite measured by the BET nitrogen adsorption method is 280 m$^2$/g.

Figure 17:
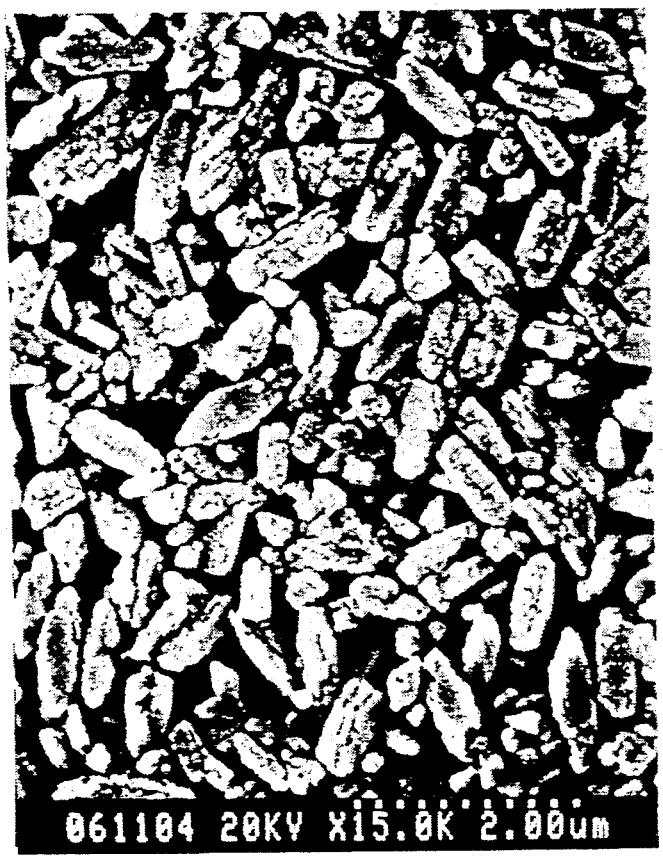
FIG. 17 is a scanning electron photomicrograph of a particulate zeolite present in the product slurry obtained in Example 4.

A scanning electron photomicrograph of the particulate zeolite is shown in FIG. 17. As observed from FIG. 17, the produced zeolite is comprised of particles of about 0.5 to 1 μm in particle size with a rough surface.

Further, the above-mentioned cake obtained by filtration and water washing is put in 1N nitric acid to form a 10% by weight slurry, which is heated at 60° C. for 4 hours to effect an ion exchange. The resultant slurry is filtered to obtain a cake, and the cake is washed with a 5-fold volume of water to obtain a zeolite in an H form.

Figure 18:
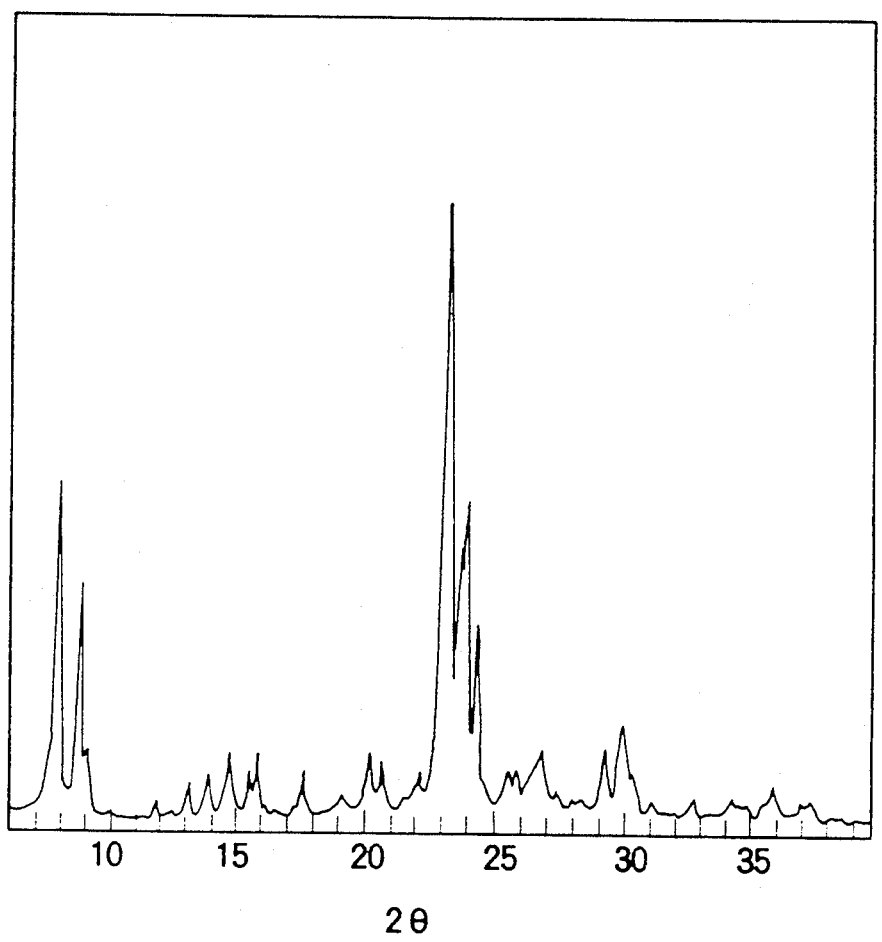
FIG. 18 shows an X-ray powder diffraction pattern of a particulate zeolite obtained by successively subjecting the product slurry produced in Example 4 to conversion to an H (proton) form, filtration, water washing and drying.

An X-ray powder diffraction pattern of the obtained zeolite in an H form is shown in FIG. 18. The ratio of the number of external surface acid sites to the total number of acid sites as measured by the amine adsorption method is 0.18.

EXAMPLE 5

(1) Production of first precursory slurry mixture

To 10.5 kg of the first precursory slurry mixture obtained in item (3) of Example 4 is added a solution obtained by dissolving 5.65 kg of the same aqueous sodium silicate solution as used in Example 1, 28 g of sodium hydroxide and 45 g of sodium aluminate in 2.21 kg of water, to thereby obtain a homogeneous slurry. The homogeneous slurry is charged into an autoclave having a capacity of 50 liters, and a solution obtained by dissolving 0.424 kg of aluminum sulfate [Al$_2$(SO$_4$)$_3$.16-H$_2$O] in 10 kg of water is fed in the slurry charged into the autoclave by means of a pump over a period of about 30 minutes while stirring at 150 rpm. Further, to the resultant slurry is added a solution obtained by dissolving 0.2 kg of sulfuric acid in 5.84 kg of water by means of the pump over a period of about 15 minutes to thereby obtain a homogeneous gel. Thereafter, the temperature of the gel is elevated to 180° C., and a hydrothermal reaction is effected for 5 hours to obtain a first precursory slurry mixture.

The thus obtained first precursory slurry mixture is cooled to 30° C., and a portion thereof is filtered, followed by drying at 120° C. for 8 hours. Thus, a precursory zeolite is obtained. An X-ray powder diffraction pattern of the obtained precursory zeolite corresponds to that of a zeolite of the ZSM-5 family.

The surface area of the precursory zeolite measured by the BET nitrogen adsorption method is 155 m$^2$/g.

The concentration of SiO$_2$ dissolved in the filtrate obtained by the above-mentioned filtration is 2.5% by weight.

(2) Production of product slurry

To 10.5 kg of the first precursory slurry mixture obtained in item (1) above is added a solution obtained by dissolving 5.65 kg of the above-mentioned aqueous sodium silicate solution, 28 g of sodium hydroxide and 20 g of sodium aluminate in 2.21 kg of water, thereby obtaining a homogeneous slurry. The resultant slurry is charged into an autoclave having a capacity of 50 liters, and a solution obtained by dissolving 0.424 kg of aluminum sulfate [Al$_2$(SO$_4$)$_3$.16H$_2$O] in 10 kg of water is fed in the slurry charged into the autoclave by means of a pump over a period of about 30 minutes while stirring at 150 rpm. Further, to the resultant slurry is added a solution obtained by dissolving 0.2 kg of sulfuric acid in 5.84 kg of water over a period of about 15 minutes by means of the pump to thereby obtain a homogeneous gel. Thereafter, the temperature of the gel is elevated to 165° C. for 20 hours to obtain a product slurry containing a particulate zeolite.

The obtained product slurry is filtered, and the resultant cake is washed with a 5-fold volume of water. Thereafter, the washed cake is put in 1N nitric acid to prepare a 10% by weight slurry, which is heated at 60° C. for 4 hours to thereby effect an ion exchange.

The thus obtained slurry is filtered, and the resultant cake is washed with a 5-fold volume of water, followed by drying at 120° C. for 8 hours to thereby obtain a dry zeolite in an H form.

Figure 19:
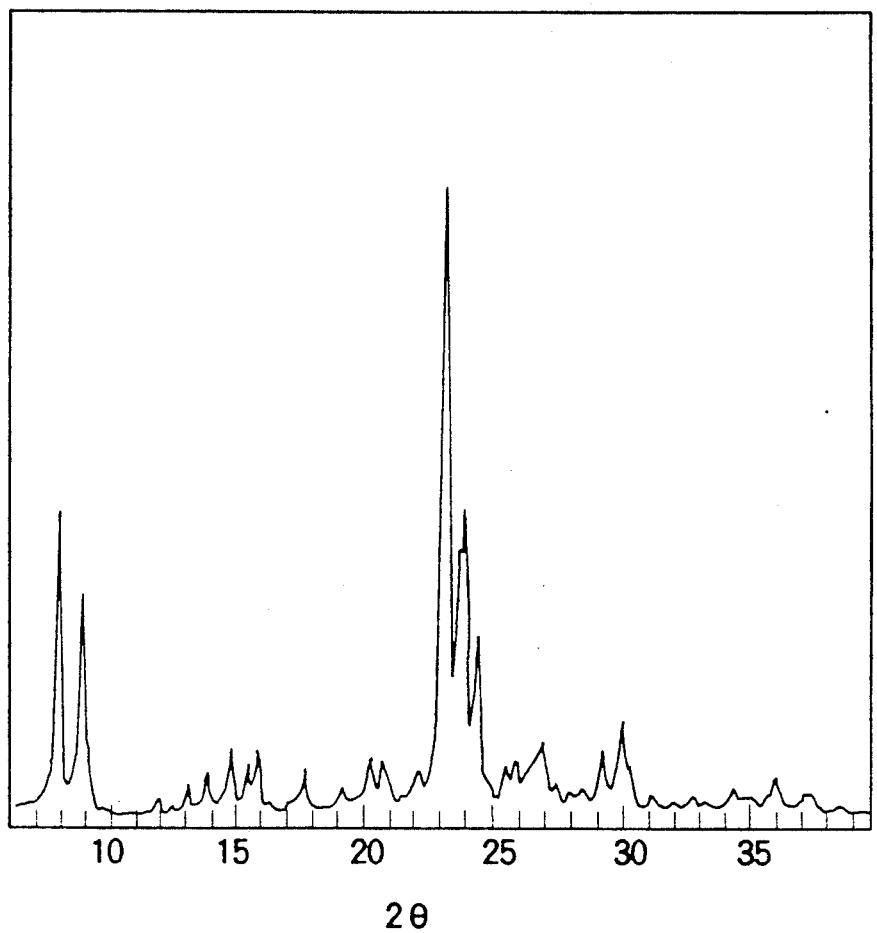
FIG. 19 shows an X-ray powder diffraction pattern of a particulate zeolite obtained by successively subjecting the product slurry produced in Example 5 to conversion to an H (proton) form, filtration, water washing and drying.

An X-ray powder diffraction pattern of the zeolite in an H form is shown in FIG. 19. From FIG. 19, it is apparent that the zeolite is a zeolite of the ZSM-5 family. A scanning electron photomicrograph thereof is shown in FIG. 20. As is apparent from FIG. 20, the zeolite is extremely fine particles of about 0.05 μm in particle size.

The ratio of the number of external surface acid sites to the number of total acid sites as measured by the amine adsorption method is 0.3, and the surface area of the particulate ZSM-5 zeolite measured by the BET nitrogen adsorption method is 360 m$^2$/g.

EXAMPLE 6

Using, as a catalyst, the slurry containing the zeolite in an H form which has been obtained in item (5) of Example 4, hydration of cyclohexene to produce cyclohexanol is conducted in the following reactor apparatus under the following conditions.

Reactor apparatus: stainless steel-made autoclave having an inner volume of 1 liter, in which a settler for separating an oil (cyclohexene and cyclohexanol) from a slurry is disposed
Capacity of reactor apparatus for oil: 240 ml
Concentration of zeolite (catalyst) in slurry: 30% by weight
Feed rate of cyclohexene: 166 ml/hr
Reaction temperature: 120° C.

240 ml of the slurry is charged into the reactor apparatus, and cyelohexene is fed at the above-mentioned rate under agitation. The oil is continuously withdrawn through an overflow nozzle from the settler. Water which has been consumed in the hydration reaction is compensated for by pulsewise feeding fresh water by means of a pump at every 24 hours.

The cyclohexanol concentrations of the overflown oil measured from the start of the reaction up to 500 hours later are shown in Table 1.

As is apparent from Table 1, the particulate zeolite of the present invention exhibits high catalytic activity, and the deterioration of the activity with the lapse of time is extremely small.

TABLE 1

| Reaction time (hr) | Concentration of cyclohexanol (% by weight) |
|---|---|
| 10 | 12.8 |
| 200 | 10.8 |
| 500 | 9.5 |

COMPARATIVE EXAMPLE 1

A slurry comprising, dispersed in water, a zeolite having a surface area of 80 m$^2$/g is obtained by carrying out hydrothermal reaction in substantially the same manner as described in item (1) of Example 4. The obtained slurry is cooled to 30° C., filtered, and the resultant cake is washed with a 5-fold volume of water, followed by drying at 120° C. for 8 hours, thereby obtaining a dry zeolite.

Figure 21:
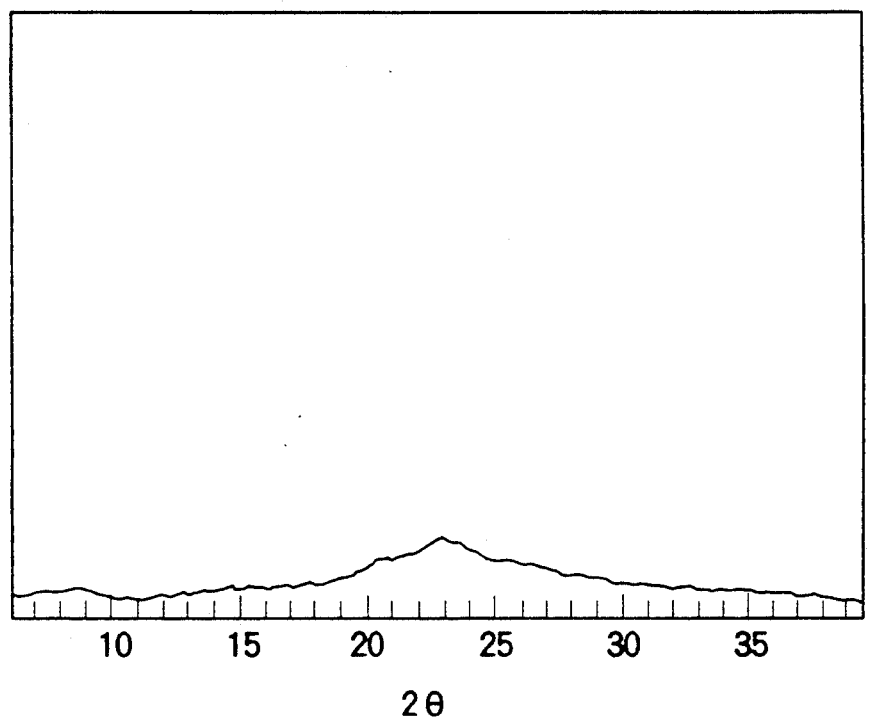
FIG. 21 shows an X-ray powder diffraction pattern of a precursory zeolite in the dry state, which is dispersed in the first precursory slurry mixture obtained in Comparative Example 1(1)

An X-ray powder diffraction pattern of the thus obtained zeolite is shown in FIG. 21. As is apparent from FIG. 21, the zeolite is scarcely crystallized.

A slurry comprising, dispersed in water, solids comprised of a zeolite, mordenite and α-quartz having a surface area of 205 m$^2$/g, is obtained by carrying out hydrothermal in substantially the same manner as described in item (1) of Example 4.

Figure 22:
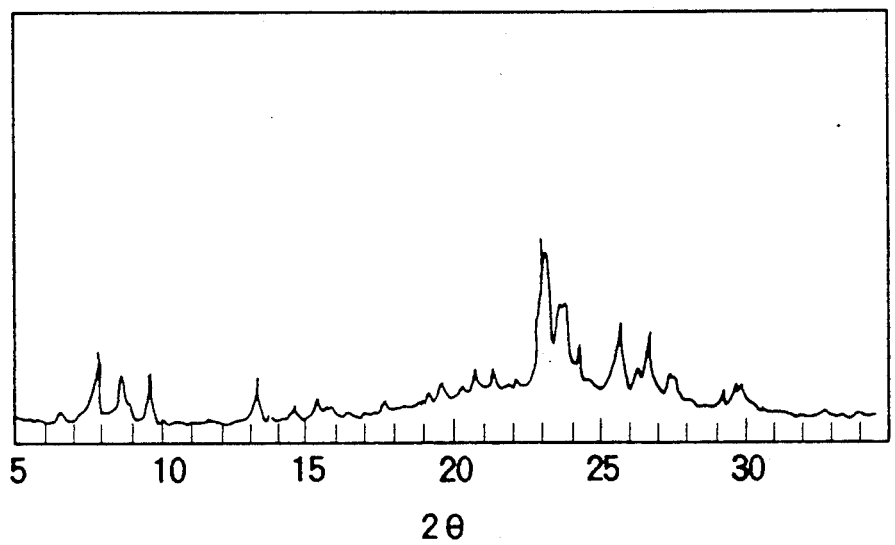
FIG. 22 shows an X-ray powder diffraction pattern of a precursory zeolite in the dry state, which is dispersed in the first precursory slurry mixture obtained in Example 1(2)

An X-ray powder diffraction pattern of the above-mentioned solids is shown in FIG. 22.

The above shows that the reproducibility of a first precursory slurry mixture is poor without the use of a nucleating slurry during the hydrothermal reaction.

COMPARATIVE EXAMPLE 2

Hydrothermal reaction is conducted using substantially the same composition of raw materials and under substantially the same conditions as in item (5) of Example 4, except that the slurry containing a scarcely crystallized zeolite which has been produced in Comparative Example 1 is used in place of the first precursory slurry mixture.

The resultant product slurry is cooled to 30° C., filtered to obtain a cake, and the cake is washed with water, followed by drying at 120° C. for 8 hours. Thus, a dry particulate zeolite is produced.

Figure 23:
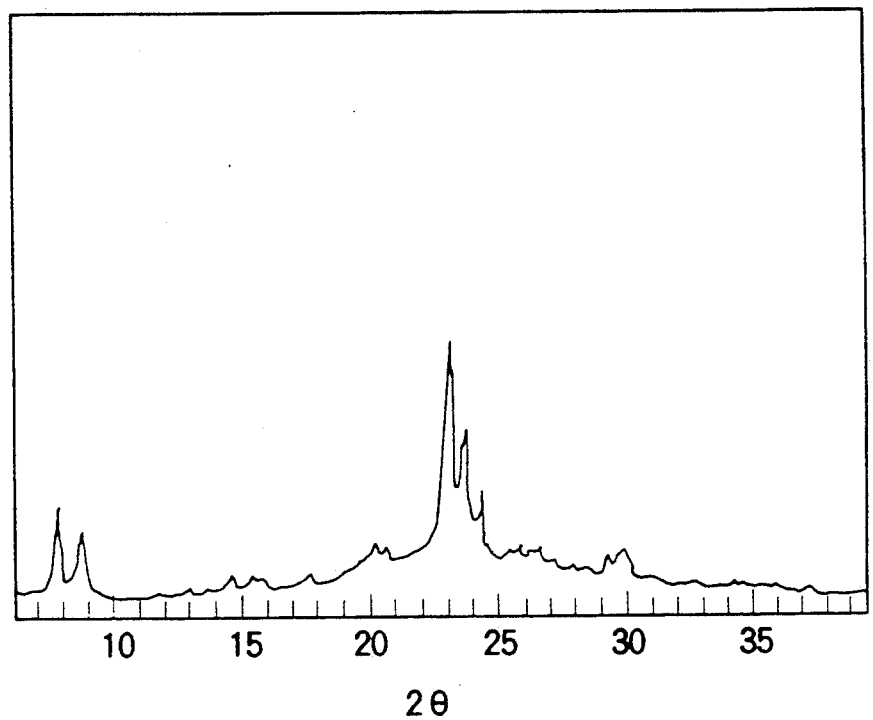
FIG. 23 shows an X-ray powder diffraction pattern of a particulate zeolite obtained by successively subjecting the product slurry produced in Comparative Example 2(1) to filtration, water washing and drying.

An X-ray powder diffraction pattern thereof is shown in FIG. 23. As is apparent from FIG. 23, crystallization of the zeolite is not yet completed. The surface area measured by the BET nitrogen adsorption method is 200 m$^2$/g.

The above shows that when the first precursory slurry mixture having a surface area of less than 100 m$^2$/g is employed in the hydrothermal reaction, the crystallization rate of the zeolite is extremely delayed.

COMPARATIVE EXAMPLE 3

Hydrothermal reaction is conducted using substantially the same composition of raw materials and under substantially the same conditions as in item (5) of Example 4, except that the slurry comprising a zeolite, mordenite and α-quartz obtained in Comparative Example 1 is used.

The resultant slurry is cooled to 30° C., filtered to obtain a cake, and the cake is washed with water, followed by drying at 120° C. for 8 hours. As a result, a solid product is obtained.

An X-ray powder diffraction pattern thereof shows that the solid product is a mixture of a zeolite, mordenite and α-quartz.

COMPARATIVE EXAMPLE 4

Hydrothermal reaction is conducted using substantially the same composition of raw materials and under substantially the same conditions as in item (2) of Example 3, except that the product slurry obtained in item (2) of Example 3 is used in place of a first precursory slurry mixture.

The resultant slurry is cooled to 30° C., filtered to obtain a cake, and the cake is washed with water, followed by drying at 120° C. for 8 hours. Thus, a particulate zeolite is obtained.

As observed from an X-ray powder diffraction pattern thereof, it is found that the particulate zeolite is of the ZSM-5 family. A scanning electron photomicrograph is shown in FIG. 24. As is apparent from FIG. 24, the zeolite is comprised of particles of about 10 μm in particle size with a rough surface.

Further, the above-mentioned cake obtained by filtration and water washing is put in 1N nitric acid to prepare a 10% by weight slurry, which is heated at 60° C. for 4 hours to effect an ion exchange. The prepared slurry is filtered and washed with water, followed by drying at 120° C. for 8 hours to thereby obtain a dry zeolite in an H form. With respect to the zeolite, the ratio of the number of external surface acid sites to the total number of acid sites measured by the amine adsorption method is 0.028.

From the above, it is found that fine particles of a zeolite cannot be obtained by the use of the first precursory slurry mixture having a surface area of larger than 200 m²/g.

COMPARATIVE EXAMPLE 5

To 2 kg of the first precursory slurry mixture obtained in item (1) of Example 3 are added 5.7 kg of the same aqueous sodium silicate solution as employed in item (1) of Example 3 and 2.2 kg of water, thereby obtaining a homogeneous slurry. To the homogeneous slurry is added a solution obtained by dissolving 0.42 kg of aluminum sulfate [Al$_2$(SO$_4$)$_3$.16H$_2$O] in 10 kg of water under agitation by means of a pump, and further, a solution obtained by dissolving 0.26 kg of sulfuric acid in 6 kg of water is added by means of the pump. Thus, a gel is obtained. The obtained gel is charged into an autoclave having a capacity of 50 liters, and then, heated at 160° C. for 20 hours while stirring at 250 rpm, to thereby effect hydrothermal reaction. Thus, a slurry is produced.

The produced slurry is cooled to 30° C., filtered, and the resultant cake is washed with water, followed by drying at 120° C. for 8 hours. Thus, a dry solid is obtained.

Figure 25:
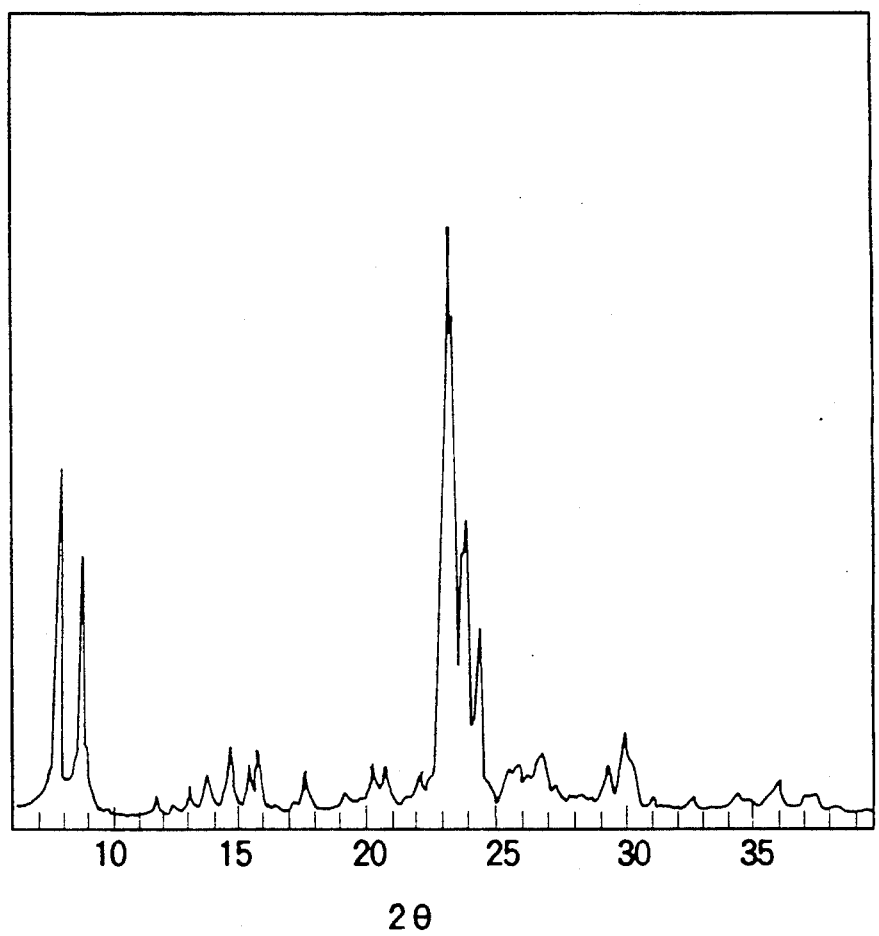
FIG. 25 shows an X-ray powder diffraction pattern of a particulate zeolite obtained by successively subjecting the product slurry produced in Comparative Example 5(1) to filtration, water washing and drying.
Figure 26:
FIG. 26 shows a scanning electron photomicrograph of a particulate zeolite obtained by successively subjecting the product slurry produced in Comparative Example 5(1) to filtration, water washing and drying.

An X-ray powder diffraction pattern thereof is shown in FIG. 25. As observed from the X-ray powder diffraction pattern, the solid is identified as a zeolite of the ZSM-5 family. A scanning electron photomicrograph thereof is shown in FIG. 26. As observed from FIG. 26, the produced zeolite is comprised of particles of about 2 μm in particle size with a rough surface.

Further, the above-mentioned cake obtained by filtration and water washing is put in 1N nitric acid to form a 10% by weight slurry, which is heated at 60° C. for 4 hours to effect an ion exchange. The resultant slurry is filtered to obtain a cake, and the obtained cake is washed with water, followed by drying at 120° C. for 8 hours to thereby obtain a zeolite in a H form. With respect to the zeolite, the ratio of the number of external surface acid sites to the total number of acid sites measured by the amine adsorption method is 0.025. This small value would be due to the amount of the first precursory slurry mixture being as small as 7.5% by weight, based on the total amount of the whole mixture.

COMPARATIVE EXAMPLE 6

Hydration reaction of cyclohexene to produce cyclohexanol is conducted under substantially the same conditions as in Example 6, except that the zeolite in an H form obtained in Comparative Example 4 is used as a catalyst.

The concentrations of cyclohexanol in the overflown oil from the start of the reaction up to 500 hours later are shown in Table 2.

As is apparent from Table 2, when a zeolite catalyst comprised of particles having a large particle size is used, the hydration activity is low, and the deterioration of the activity is large.

TABLE 2

| Reaction time (hr) | Concentration of cyclohexanol (% by weight) |
|---|---|
| 10 | 11.9 |
| 200 | 10.0 |
| 500 | 8.0 |

REFERENCE EXAMPLE 5.65 kg of the same aqueous sodium silicate solution as used in Example 1, 28 g of sodium hydroxide and 20 g of sodium aluminate are added to 2.21 kg of water to thereby obtain a homogenous solution. To the solution is added 8 kg of the filtrate obtained by filtering the first precursory slurry mixture obtained in item (1) of Example 5, thereby obtaining a homogeneous solution. The thus obtained solution is charged into an autoclave having a capacity of 50 liters, and a solution obtained by dissolving 0.424 kg of aluminum sulfate [Al$_2$(SO$_4$)$_3$.16-H$_2$O] in 10 kg of water is added to the solution charged into the autoclave by means of a pump over a period of about 30 minutes while stirring at 150 rpm.

Further, a solution obtained by dissolving 0.2 kg of sulfuric acid in 5.84 kg of water is added by means of the pump over a period of about 15 minutes to thereby obtain a homogeneous gel. Thereafter, the gel is heated at 165° C. for 20 hours to effect hydrothermal reaction. Thus, a product slurry is obtained.

Figure 27:
FIG. 27 shows a scanning electron photomicrograph of a particulate zeolite obtained by successively subjecting the product slurry produced in Reference Example to filtration, water washing and drying.

The thus obtained product slurry is filtered, and the resultant cake is washed with a 5-fold volume of water, followed by drying at 120° C. for 8 hours to thereby obtain a dry solid. As observed from an X-ray powder diffraction pattern thereof, it is found that the solid is a zeolite of the ZSM-5 family containing a trace amount of mordenite. A scanning electron photomicrograph thereof is shown in FIG. 27. As observed from the photomicrograph, the zeolite is comprised of particles of about 1 μm in particle size with a rough surface.

Further, the zeolite is changed to an H form in substantially the same manner as in item (2) of Example 5. With respect to the H form zeolite, the ratio of the number of external surface acid sites to the number of total acid sites measured by the amine adsorption method is 0.04. From the above, it is apparent that even the filtrate of the first precursory slurry mixture is effective in producing fine particles of a zeolite.

What is claimed is:

1. A method for producing a particulate zeolite in a slurry form of an isolated form, which comprises the steps of:
   (1) providing a nucleating slurry comprising a semicrystalline zeolite dispersed in an aqueous medium, said semicrystalline zeolite exhibiting in a dry solid form peaks ascribed to interplanar spacings of 11.1±0.2, 10.1±0.2, 3.85±0.07, 3.74±0.05 and 3.72±0.05 angstroms in an X-ray powder diffraction pattern and having a surface area of from 100 to 200 m²/g as measured by the BET nitrogen adsorption method,
   (2) mixing said nucleating slurry with a first raw material mixture comprised of a silica source, an alumina source, an alkali metal source and water to obtain a preliminary slurry mixture,
   (3) heating said preliminary slurry mixture at a temperature of from 100° to 180° C. under agitation to form a first precursory slurry mixture comprising a precursor zeolite dispersed in an aqueous medium, said precursory zeolite exhibiting in a dry solid form peaks of the same characteristics as defined above in the X-ray powder diffraction pattern and having a surface area of from 100 to 200 m²/g as measured by the BET nitrogen adsorption method,
   (4) mixing at least a portion of said first precursory slurry mixture with a second raw material mixture comprised of a silica source, an alumina source, an alkali metal source and water to obtain a second precursory slurry mixture, (5) heating said second precursory slurry mixture at a temperature of from 100° to 200° C. until a product slurry comprising a particular zeolite dispersed in an aqueous medium is obtained, said particulate zeolite exhibiting in a dry solid peaks of the same characteristics as defined above in the X-ray powder diffraction pattern and having a surface area of at least 250 m²/g as measured by the BET nitrogen adsorption method, and optionally (6) isolating the particulate zeolite from said product slurry.

2. The method according to claim 1, wherein said nucleating slurry provided in step (1) is a portion of said first precursory slurry mixture obtained in step (3).

3. The method according to claim 2, wherein a portion of said first precursory slurry mixture obtained in step (3) is recycled from step (3) to step (1) and used as the nucleating slurry in step (1) while the remaining portion of said first precursory slurry mixture is subjected to the mixing in step (4).

4. The method according to claim 1, wherein in step (2) said nucleating slurry is mixed with said first raw material mixture in a weight proportion of from 1:9 to 2:3.

5. The method according to claim 1, wherein in step (4) said first precursory slurry mixture is mixed with said second raw material mixture in a weight proportion of from 1:9 to 2:3.

6. The method according to claim 1, wherein said first raw material mixture and said second raw material mixture each further comprise an organic material.

7. The method according to claim 6, wherein said organic material is a lower alkylurea compound.

8. The method according to claim 1, wherein said first raw material mixture and said second raw material mixture each contain no organic material.

9. The method according to claim 1, wherein said first raw material mixture and said second raw material mixture each have a molar ratio of silica ($SiO_2$) to alumina ($Al_2O_3$) of from 25 to 40.

10. The method according to claim 1, wherein the aqueous medium of said first precursory slurry mixture obtained in step (3) contains silica ($SiO_2$) in a concentration of from 0.5 to 5% by weight, based on the weight of the aqueous medium.

11. The method according to claim 10, wherein said concentration is in the range of from 1 to 3% by weight.

12. The method according to claim 1, wherein said particulate zeolite is particulate ZSM-5.

13. The method according to claim 1, wherein said preliminary slurry mixture obtained in step (2) and said second precursory slurry mixture obtained in step (4) each have a pH value of from 11 to 12.

* * * * *